United States Patent
Choi et al.

(10) Patent No.: US 12,271,622 B2
(45) Date of Patent: Apr. 8, 2025

(54) PROCESSOR USING HOST MEMORY BUFFER AND STORAGE SYSTEM INCLUDING THE PROCESSOR

(71) Applicant: SAMSUNG ELECTRONICS CO., LTD., Suwon-si (KR)

(72) Inventors: Jinhwan Choi, Seoul (KR); Byungki Lee, Hwaseong-si (KR); Junhee Kim, Suwon-si (KR); Sunghyun Noh, Seoul (KR); Keunsan Park, Hwaseong-si (KR); Jekyeom Jeon, Siheung-si (KR); Jooyoung Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 563 days.

(21) Appl. No.: 17/647,745

(22) Filed: Jan. 12, 2022

(65) Prior Publication Data
US 2022/0222011 A1     Jul. 14, 2022

(30) Foreign Application Priority Data

Jan. 13, 2021  (KR) .................. 10-2021-0004938
May 20, 2021  (KR) .................. 10-2021-0064637

(51) Int. Cl.
*G06F 12/00*   (2006.01)
*G06F 3/06*    (2006.01)

(52) U.S. Cl.
CPC .......... *G06F 3/0656* (2013.01); *G06F 3/0611* (2013.01); *G06F 3/0659* (2013.01); *G06F 3/0673* (2013.01)

(58) Field of Classification Search
CPC .... G06F 3/0656; G06F 3/0611; G06F 3/0659; G06F 3/0673; G06F 3/0613; G06F 3/0679
See application file for complete search history.

(56) References Cited

U.S. PATENT DOCUMENTS 6,081,883 A  *  6/2000  Popelka .................. G06F 16/10
                                                  711/111
6,732,292 B2    5/2004  Hertz et al.
(Continued)

FOREIGN PATENT DOCUMENTS

EP           3511814       7/2019
KR    10-2018-0054394      5/2018
(Continued)

OTHER PUBLICATIONS

2nd Office Action Dated Jul. 22, 2022 in Corresponding KR Patent Application No. 10-2021-0064637.
(Continued)

*Primary Examiner* — Daniel D Tsui
(74) *Attorney, Agent, or Firm* — MORGAN, LEWIS & BOCKIUS LLP

(57) ABSTRACT

A processor configured to control a storage device includes at least one host write buffer generated based on device information of the storage device, and a control module configured to control the at least one host write buffer. The control module is further configured to store, in the at least one host write buffer, a plurality of write commands and merge the plurality of write commands to generate a merged write command.

18 Claims, 20 Drawing Sheets

(56) References Cited

U.S. PATENT DOCUMENTS

| | | | |
|---|---|---|---|
| 7,532,644 B1* | 5/2009 | Masputra | H04L 69/22 370/428 |
| 8,064,755 B2* | 11/2011 | Seo | G11B 27/105 386/351 |
| 8,078,848 B2 | 12/2011 | Asnaashari | |
| 8,417,901 B2 | 4/2013 | Lin | |
| 9,996,457 B2 | 6/2018 | Post et al. | |
| 10,101,934 B1* | 10/2018 | Ben-Moshe | G06F 3/0631 |
| 10,108,371 B2 | 10/2018 | Nimmagadda et al. | |
| 10,599,591 B2 | 3/2020 | Lee et al. | |
| 10,761,775 B2 | 9/2020 | Kachare et al. | |
| 11,011,243 B2 | 5/2021 | Lee et al. | |
| 11,163,689 B2 | 11/2021 | Choi | |
| 11,422,726 B1* | 8/2022 | Jo | G06F 3/067 |
| 2011/0296085 A1* | 12/2011 | Eleftheriou | G06F 12/0246 711/E12.008 |
| 2012/0198132 A1* | 8/2012 | Han | G11C 11/5628 711/E12.008 |
| 2012/0300636 A1* | 11/2012 | Wang | H04W 8/04 370/235 |
| 2014/0304453 A1* | 10/2014 | Shao | G06F 12/0246 711/103 |
| 2015/0327245 A1* | 11/2015 | Zhu | H04W 72/0446 370/329 |
| 2016/0026406 A1* | 1/2016 | Hahn | G06F 3/0685 711/103 |
| 2017/0371585 A1* | 12/2017 | Lazo | G06F 12/0246 |
| 2018/0074864 A1* | 3/2018 | Chen | G06F 9/5016 |
| 2018/0150220 A1* | 5/2018 | Pandian | G06F 3/0659 |
| 2019/0034347 A1* | 1/2019 | Haswell | G06F 12/0246 |
| 2019/0057049 A1* | 2/2019 | Koo | G06F 12/0246 |
| 2019/0187931 A1 | 6/2019 | Byun | |
| 2019/0220404 A1* | 7/2019 | Hwang | G06F 12/0253 |
| 2019/0265889 A1 | 8/2019 | Asnaashari et al. | |
| 2019/0278523 A1 | 9/2019 | Benisty | |
| 2019/0294369 A1 | 9/2019 | Yun | |
| 2020/0133566 A1* | 4/2020 | Kim | G06F 1/3206 |
| 2020/0326884 A1 | 10/2020 | Hu | |
| 2020/0341686 A1 | 10/2020 | Lee et al. | |

FOREIGN PATENT DOCUMENTS

| | | |
|---|---|---|
| KR | 10-2018-0059342 | 6/2018 |
| KR | 10-2018-0134119 | 12/2018 |
| KR | 10-2019-0013106 | 2/2019 |
| KR | 10-2019-0073824 | 6/2019 |
| KR | 10-2019-0099994 | 8/2019 |
| KR | 10-2020-0005229 | 1/2020 |
| KR | 1020200056538 | 5/2020 |

OTHER PUBLICATIONS

ESSR Dated May 27, 2022 in Corresponding EP Patent Application No. 22150727.0.

1st Office Action Dated Mar. 14, 2022 in Corresponding KR Patent Application No. 10-2021-0064637.

Notice of Allowance Dated Mar. 24, 2023 in Corresponding KR Patent Application No. 10-2021-0064637.

* cited by examiner

PROCESSOR USING HOST MEMORY BUFFER AND STORAGE SYSTEM INCLUDING THE PROCESSOR

CROSS-REFERENCE TO RELATED APPLICATIONS

This application claims priority under 35 U.S.C. § 119 to Korean Patent Application Nos. 10-2021-0004938, filed on Jan. 13, 2021, and 10-2021-0064637, filed on May 20, 2021, in the Korean Intellectual Property Office, the disclosures of which are incorporated by reference herein in their entireties.

FIELD

The present disclosure relates to apparatuses and methods, and more particularly, to a processor that efficiently uses a memory buffer in a host and a storage system including the processor.

DISCUSSION OF RELATED ART

A storage system generally includes a host and a storage device. The host and the storage device may be connected to each other through a variety of standard interfaces such as universal flash storage (UFS), serial ATA (SATA), small computer system interface (SCSI), serial attached SCSI (SAS), and embedded multi-media card (eMMC). When the storage system is used in a mobile device, a high-speed operation between the host and the storage device may be desired, and because the space for a write buffer in the storage device is limited, it may be beneficial to efficiently use a memory buffer in the host.

SUMMARY

An embodiment of the present disclosure provides a storage system in which write performance is improved by generating a write buffer in a host in consideration of characteristics of a storage device, merging write commands and transmitting a merged write command to the storage device.

According to an embodiment of the present disclosure, there is provided a processor configured to control a storage device, the processor including at least one host write buffer generated based on device information of the storage device, and a control module configured to control the at least one host write buffer. The control module is further configured to store, in the at least one host write buffer, a plurality of write commands and merge the plurality of write commands to generate a merged write command.

According to another embodiment of the present disclosure, there is provided a storage system including a host and a storage device, wherein the host includes at least one host write buffer generated based on device information of the storage device, and a control module configured to control the at least one host write buffer. The control module is further configured to store, in the at least one host write buffer, a plurality of write commands generated by the host and merge the plurality of write commands to generate a merged write command.

According to another embodiment of the present disclosure, there is provided a method of controlling a storage device, the method including generating at least one host write buffer based on device information of the storage device, storing, in the at least one host write buffer, a plurality of write commands generated by a host, and merging the plurality of write commands to generate a merged write command.

BRIEF DESCRIPTION OF THE DRAWINGS

Embodiments of the present disclosure will be more clearly understood from the following detailed description taken in conjunction with the accompanying drawings, in which.

DETAILED DESCRIPTION

Figure 1:
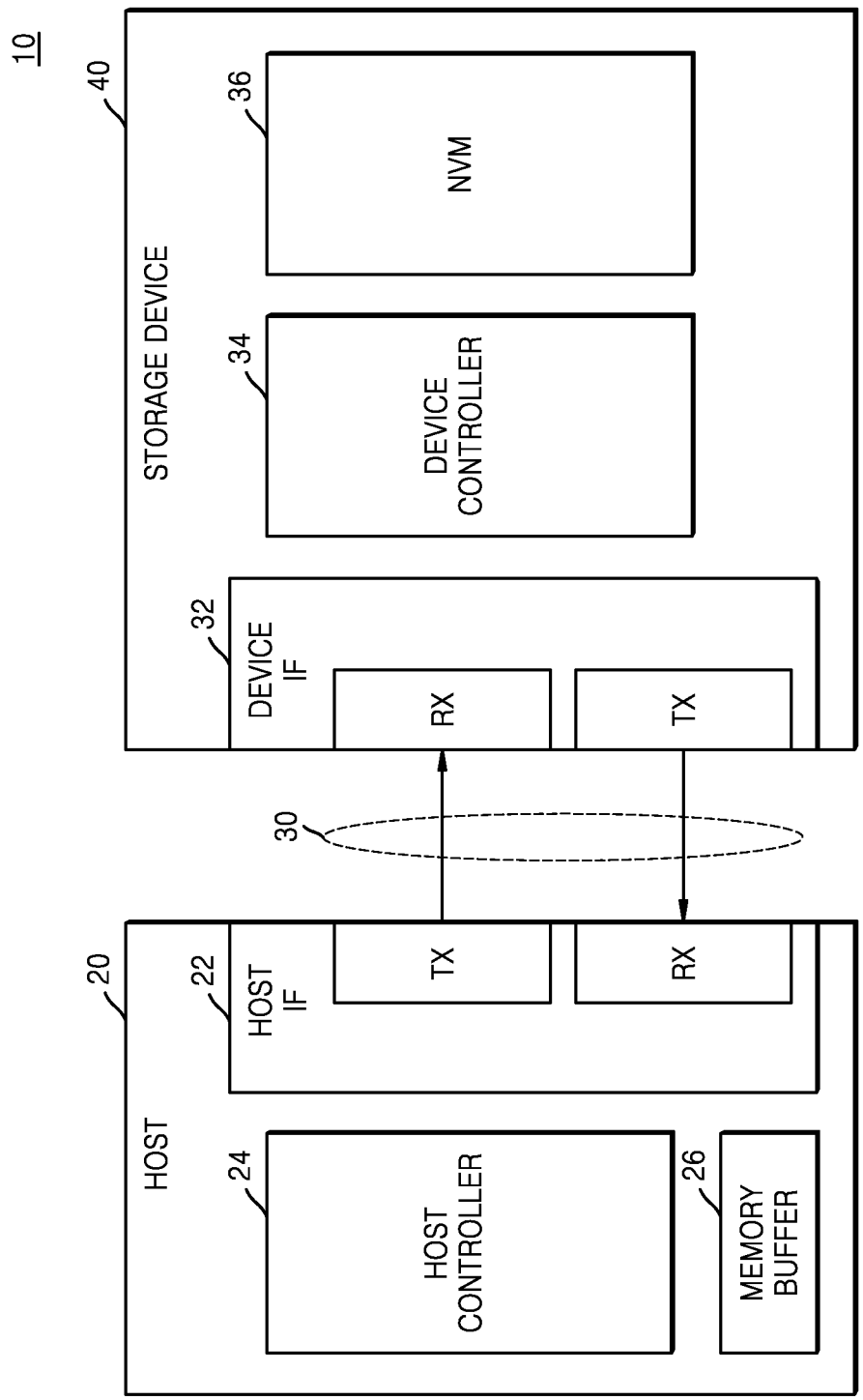
FIG. 1 is a block diagram of a storage system according to an embodiment of the present disclosure.

FIG. 1 illustrates a storage system 10 according to an embodiment of the present disclosure.

Referring to FIG. 1, the storage system 10 may include a host 20 and a storage device 30. The host 20 and the storage device 30 may be connected to each other according to an interface protocol defined in a universal flash storage (UFS)

specification, and accordingly, the storage device 30 may be a UFS storage device and the host 20 may be a UFS host. However, the present disclosure is not limited thereto, and the storage device 30 and the host 20 may be connected to each other according to various standard interfaces.

The host 20 may control a data processing operation for the storage device 30, such as, for example, a data read operation or a data write operation. The host 20 may refer to a data processing device capable of processing data, such as a central processing unit (CPU), a processor, a microprocessor, or an application processor (AP). The host 20 may execute an operating system (OS) and/or various applications. In an embodiment, the storage system 10 may be included in a mobile device, and the host 20 may be implemented as an application processor (AP). In an embodiment, the host 20 may be implemented as a system-on-a-chip (SoC), and thus may be embedded in an electronic device.

In the present embodiment, a plurality of conceptual hardware configurations, which are included in the host 20 and the storage device 30, are illustrated. However, the present disclosure is not limited thereto and other configurations may be made. The host 20 may include an interconnect portion 22, which is a host interface, a host controller 24, and a host write buffer 26. The interconnect portion 22 may provide an interface 30 between the host 20 and the storage device 40. The interconnect portion 22 may include a physical layer and a link layer. The physical layer of the interconnect portion 22 may include physical components for exchanging data with the storage device 40, and may include at least one transmitter TX and at least one receiver RX. The interconnect portion 22 of the host 20 may include, for example, four transmitters and four receivers. The link layer of the interconnect portion 22 may manage data transmission and/or composition, and may manage data integrity and error.

The host controller 24 may receive information about the storage device 40 from the storage device 40 to generate the host write buffer 26. The host controller 24 may store a plurality of write commands in the host write buffer 26 to generate a merged write command by merging a plurality of write commands generated by the host 20.

The host write buffer 26 may be a portion of memory allocated by the host 20 for the storage device 40. The host write buffer 26 may be generated in a block layer of the host 20 or a device driver. The host write buffer 26 may receive write input/output (I/O) information optimized for a non-volatile memory 36 in an initialization process between the host 20 and the storage device 40, and may be statically allocated and operated.

The storage device 40 may include an interconnect portion 32, which is a device interface, a storage controller 34, and the non-volatile memory 36. The storage controller 34 may control the non-volatile memory 36 to write data to the non-volatile memory 36 in response to a write request from the host 20, or may control the non-volatile memory 36 to read data stored in the non-volatile memory 36 in response to a read request from the host 20.

The interconnect portion 32 may provide an interface 30 between the storage device 40 and the host 20. For example, the interconnect portion 32 may include a physical layer and a link layer. The physical layer of the interconnect portion 32 may include physical components for exchanging data with the host 20, and may include at least one receiver RX and at least one transmitter TX. The interconnect 32 of the storage device 40 may include, for example, four receivers and four transmitters. The link layer of the interconnect portion 32 may manage data transmission and/or combination, and may manage data integrity and errors.

In an embodiment, when the storage system 10 is a mobile device, the physical layers of the interconnect portions 22 and 32 may be defined by the "M-PHY" specification, and the link layers of the interconnect portions 22 and 32 may be defined by the "UniPro" specification. M-PHY and UniPro are interface protocols proposed by the mobile industry processor interface (MIPI) alliance. The link layers of the interconnect portions 22 and 32 may each include a physical adapted layer, which may control the physical layers such as managing data symbols or managing power.

The transmitter TX in the interconnect portion 22 of the host 20 and the receiver RX in the interconnect portion 32 of the storage device 40 may form one lane. In addition, the transmitter TX in the interconnect portion 32 of the storage device 40 and the receiver RX in the interconnect portion 22 of the host 20 may also form one lane.

The non-volatile memory 36 may include a plurality of memory cells. For example, the plurality of memory cells may be flash memory cells. In an embodiment, the plurality of memory cells may be NAND flash memory cells. However, the present disclosure is not limited thereto, and in another embodiment, the plurality of memory cells may be resistive memory cells such as resistive RAM (Re RAM) cells, phase change RAM (PRAM) cells, or magnetic RAM (MRAM) cells.

In some embodiments, the storage device 40 may be implemented as a DRAM-less device, which may refer to a device that does not include a DRAM cache. In this case, the storage controller 34 may not include a DRAM controller. For example, the storage device 40 may use a portion of the non-volatile memory 36 as a buffer memory.

In some embodiments, the storage device 40 may be an internal memory that is embedded in an electronic device. For example, the storage device 40 may include an embedded UFS memory device, an eMMC, or a solid state drive (SSD). However, the present disclosure is not limited thereto, and the storage device 40 may include a non-volatile memory (e.g., one-time programmable ROM (OTPROM), programmable ROM (PROM), erasable and programmable ROM (EPROM), electrically erasable and programmable ROM (EEPROM), mask ROM, flash ROM, or the like). In some embodiments, the storage device 40 may include an external memory that is detachable from an electronic device. For example, the storage device 40 may include at least one of a UFS memory card, a compact flash (CF) card, a secure digital (SD) card, a micro-SD card, a mini-SD card, an extreme digital (xD) card, and a memory stick.

The storage system 10 may be implemented as an electronic device, such as a personal computer (PC), a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device or portable navigation device (PND), an MP3 player, a handheld game console, or an e-book. Also, the storage system 10 may be implemented as various types of electronic devices, such as a wrist watch or a wearable device such as a head-mounted display (HMD).

Figure 2:
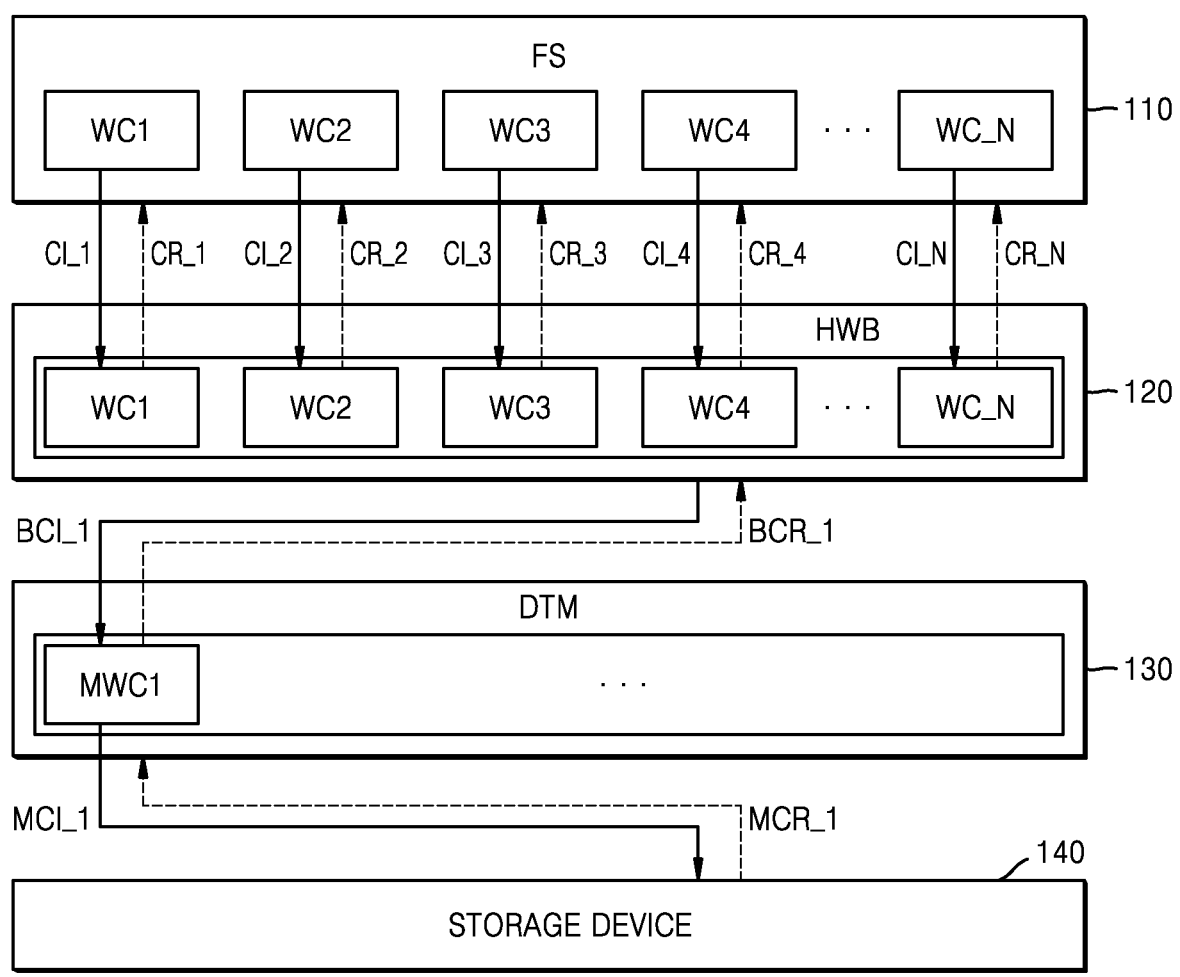
FIG. 2 is a conceptual diagram illustrating a write command merging process in a storage system according to an embodiment of the present disclosure.

FIG. 2 illustrates a write command merging process in a storage system according to an embodiment of the present disclosure.

Referring to FIG. 2, the storage system may include a file system (FS) 110, a host write buffer (HWB) 120, a data transmission manager (DTM) 130, and a storage device 140. For example, the storage system may include the host and the storage device of FIG. 1. For example, the host 20 of FIG. 1 may include the file system 110, the host write buffer 120, and the data transmission manager 130 of FIG. 2, and the storage device 40 of FIG. 1 may include the storage device 140 of FIG. 2.

For example, when a first write command WC1 is generated by the file system 110 and provided by a first interface signal CI_1 and stored in the host write buffer 120, the host write buffer 120 may transmit a first response signal CR_1 to the file system 110. When the first response signal CR_1 is received, the file system 110 may recognize that the first write command WC1 has been successfully transmitted and generate a second write command WC2. In addition, the file system 110 may simultaneously generate a second write command WC2 to an N-th write command WC_N within a preset range regardless of the first response signal CR_1 during processing of the first write command WC1, and the second write command WC2 to the N-th write command WC_N may be provided by second to N-th interface signals CI_2 to CI_N and stored in the host write buffer 120. For example, the preset range may be determined according to the number of host controller interface command queues supported by the storage system.

For example, the storage system may generate a first merged write command MWC1 by merging the first write command WC1 to the fourth write command WC4 based on information received from the storage device 140. The data transmission manager 130 may receive the first merged write command MWC1 from the host write buffer 120 and provide a first buffer response BCR1 to the host write buffer 120. The storage device 140 may receive the first merged write command MWC1 from the data transmission manager 130 and provide a first merged write command response MCR1 to the data transmission manager 130. When the first merged write command response MCR1 is received, the storage system may transmit first merge data corresponding to the first merged write command MWC1 stored in the host write buffer 120. The storage system may transmit the first merge data and merge new write commands generated by the file system 110 of the host.

FIGS. 3A to 3D illustrate a write command merging process in a storage system according to an embodiment of the present disclosure.

Referring to FIGS. 3A to 3D, to efficiently merge a write command and perform merged write command processing, a host write buffer 200 may be a doubling buffer including a first host write buffer 210 and a second host write buffer 220.

When a write command is generated as much as the size of the host write buffer 200, one host write buffer may process the write command. However, when a write command having a size larger than that of the host write buffer 200 is generated, a plurality of host write buffers may be required.

In addition, when a plurality of host write buffers are allocated, the second host write buffer 220 may process new write commands, generated by a file system, while the first host write buffer 210 processes merged data. The storage system may allocate at least one host write buffer based on the information of a storage device. In the present, a case in which one or two host write buffers are allocated is described for convenience, but the number of host write buffers is limited thereto.

Figure 3A:
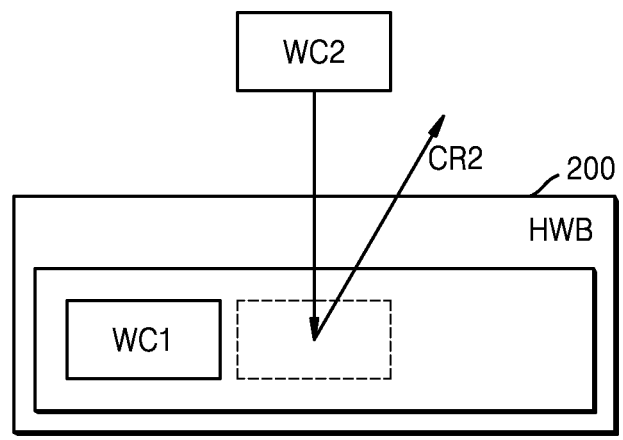
FIGS. 3A to 3D are conceptual diagrams illustrating a write command merging process in a storage system according to an embodiment of the present disclosure.

Referring to FIG. 3A, the host write buffer 200 may receive and store a second write command WC2, generated by the file system, while a first write command WC1 is stored. When the second write command WC2 is stored, the host write buffer 200 may generate a second write command response signal CR2 and transmit the second write command response signal CR2 to the file system.

For example, the second write command response signal CR2 may be configured in the same form as a response signal received when a write command is transmitted from the file system to the storage device. In this case, because the file system directly receives a response signal from the host write buffer 200 before transmitting write commands to the storage device, fast write processing may be performed.

Figure 3B:
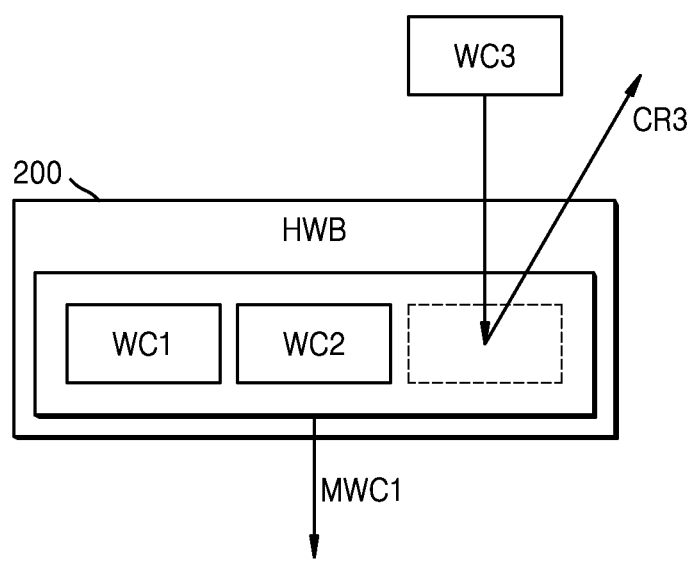

Referring to FIG. 3B, the host write buffer 200 may receive and store a third write command WC3 generated by the file system, and may generate a third write command response signal CR3 and transmit the third write command response signal CR3 to the file system.

The storage system may generate a first merged write command MWC1 by merging the first write command WC1, the second write command WC2, and the third write command WC3, stored in the host write buffer 200. The storage system may transmit the generated first merged write command MWC1 to the storage device through a data transmission manager.

Figure 3C:
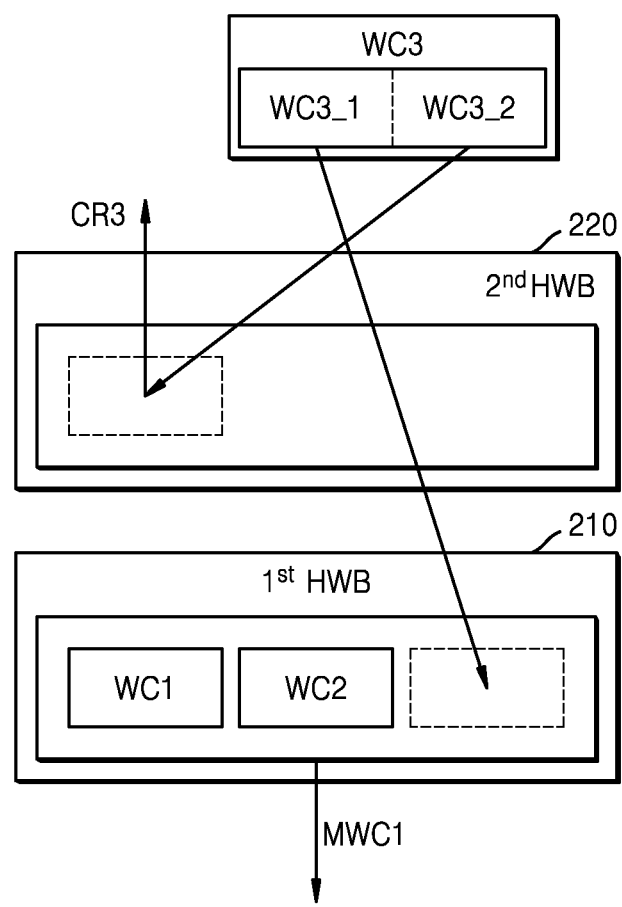

Referring to FIG. 3C, the host write buffer 200 may include the first host write buffer 210 and the second host write buffer 220. When the host write buffer 200 receives the third write command WC3 larger than a remaining space of the first host write buffer 210, a third_1 write command WC3_1 may be stored in the first host write buffer 210 and a third_2 write command WC3_2 may be stored in the second host write buffer 220. After the third write command WC3 is stored, the host write buffer 200 may generate a third write command response signal CR3 and transmit the third write command response signal CR3 to the file system.

The storage system may generate a first merged write command MWC1 by merging the first write command WC1, the second write command WC2, and the third_1 write command WC3_1, stored in the first host write buffer 210. The storage system may transmit the generated first merged write command MWC1 to the storage device through the data transmission manager. The host write buffer 200 may divide and store a write command larger than a remaining space by using the first host write buffer 210 and the second host write buffer 220.

Figure 3D:
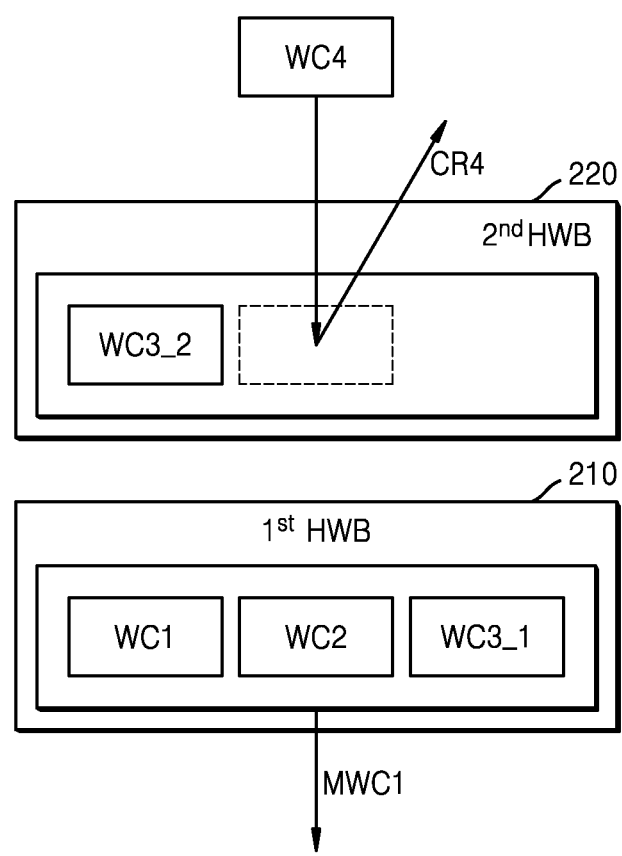

Referring to FIG. 3D, the host write buffer 200 may store a fourth write command WC4 received from the file system in the second host write buffer 220 while the first host write buffer 210 performs a write command merge and transmits the first merged write command MWC1. The storage system may use the first host write buffer 210 and the second host write buffer 220, and transmit the first merged write command MWC1 from the first host write buffer 210 and simultaneously receive other write commands from the file system through the second host write buffer 220 to store and merge the other write commands.

FIGS. 4A to 4D illustrate a write command merging process in a storage system according to an embodiment of the present disclosure.

For example, when the merged write commands have consecutive logical block addresses, there is no need to operate separate metadata, but when write commands having non-consecutive logical block addresses are merged, a meta buffer 400 for storing metadata is used. The metadata may include a logical block address and length information of a write command. The meta buffer 400 may have a form corresponding to a host write buffer 200.

Figure 4A:
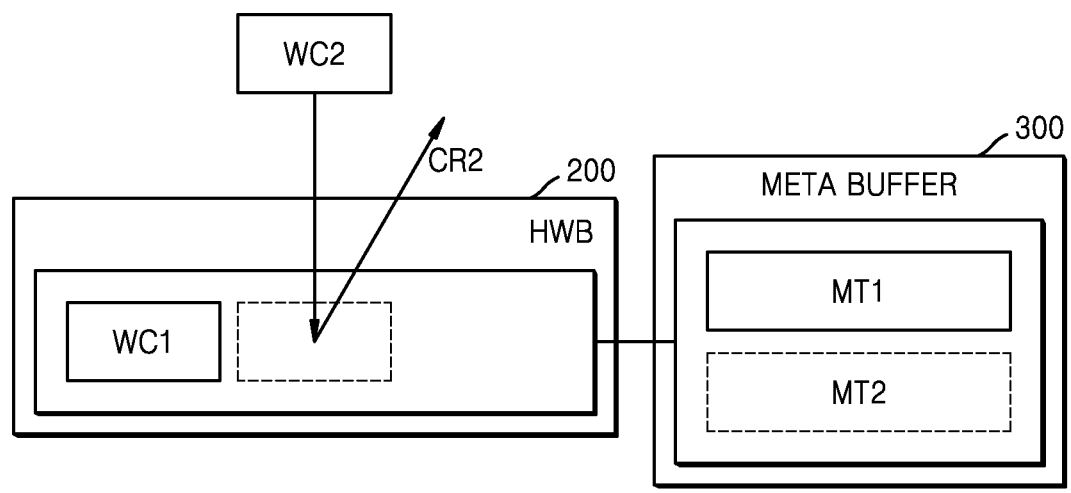
FIGS. 4A to 4D are conceptual diagrams illustrating a write command merging process in a storage system according to an embodiment of the present disclosure.

Referring to FIG. 4A, the host write buffer 200 may receive and store a second write command WC2 generated by a file system while a first write command WC1 is stored. When the second write command WC2 is stored, the host write buffer 200 may generate a second write command response signal CR2 and transmit the second write command response signal CR2 to the file system.

When the first write command WC1 is received in the host write buffer 200, a space for storing first metadata MT1 is allocated in the meta buffer 400, and the first metadata MT1 may be stored in the allocated space. The first metadata MT1 may include a logical block address and length information of the first write command WC1. When the second write command WC2 is received in the host write buffer 200, a space for storing second metadata MT2 may be allocated in the meta buffer 400.

Figure 4B:
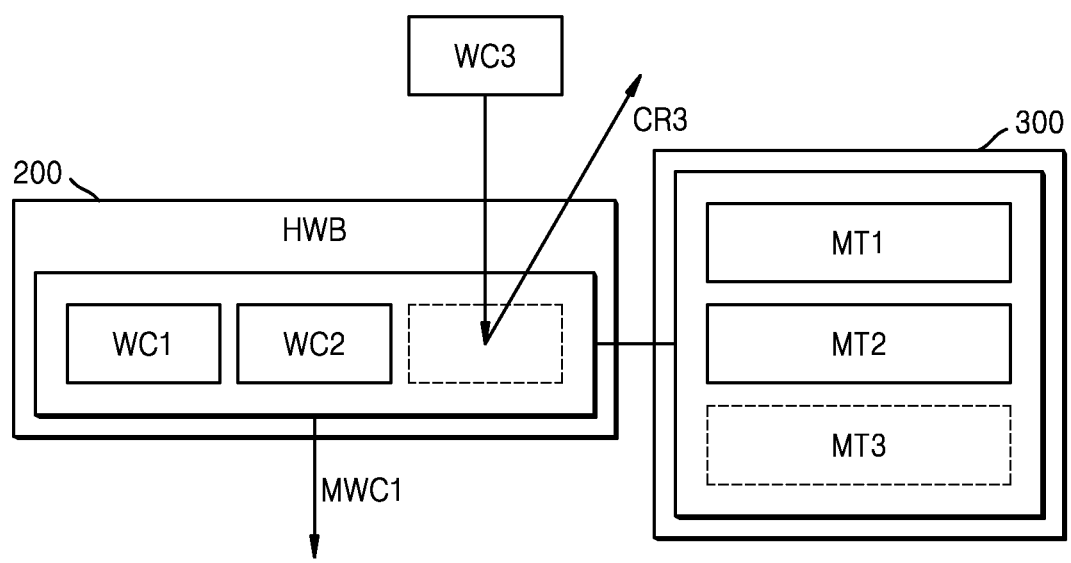

Referring to FIG. 4B, when a third write command WC3 is received in the host write buffer 200, a space in which third metadata MT3 is stored may be allocated in the meta buffer 400. When the third write command WC3 is stored, the host write buffer 200 may generate a third write command response signal CR3 and transmit the third write command response signal CR3 to the file system.

The storage system may generate a first merged write command MWC1 by merging the first write command WC1, the second write command WC2, and the third write command WC3, stored in the host write buffer 200. The storage system may transmit the generated first merged write command MWC1 to a storage device through a data transmission manager.

Figure 4C:
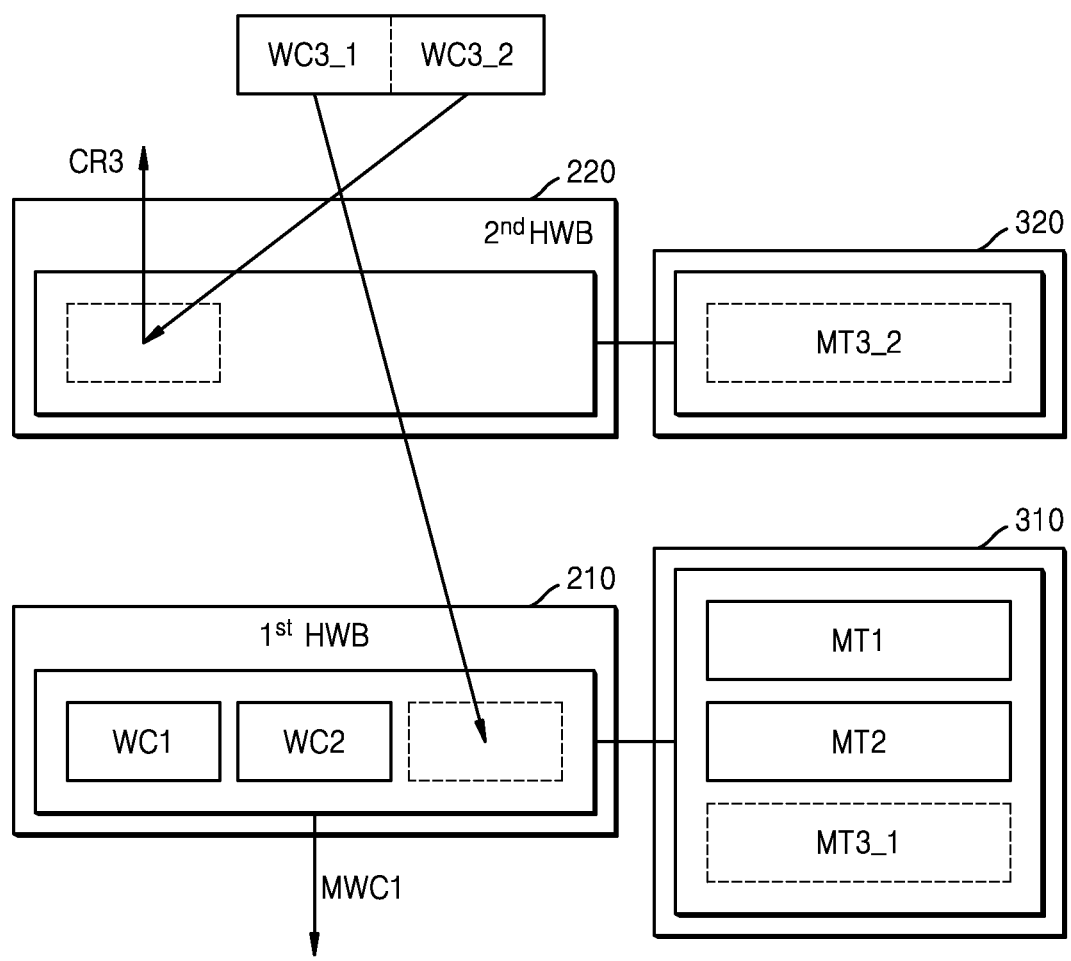

Referring to FIG. 4C, the host write buffer 200 may include a first host write buffer 210 and a second host write buffer 220. When the host write buffer 200 receives the third write command WC3 larger than a remaining space of the first host write buffer 210, a third_1 write command WC3_1 may be stored in the first host write buffer 210 and a third_2 write command WC3_2 may be stored in the second host write buffer 220. After the third write command WC3 is stored, the host write buffer 200 may generate a third write command response signal CR3 and transmit the third write command response signal CR3 to the file system.

A meta buffer may be configured to correspond to the first host write buffer 210 and the second host write buffer 220. For example, the meta buffer may include a first meta buffer 310 and a second meta buffer 320. The first meta buffer 310 may store first metadata MT1 and second metadata MT2. A third metadata may be divided and stored in the first meta buffer 310 and the second meta buffer 320 like the third write command WC3. Third_1 metadata MT3_1 may be stored in the first meta buffer 310, and third_2 metadata MT3_2 may be stored in the second meta buffer 320.

The storage system may generate a first merged write command MWC1 by merging the first write command WC1, the second write command WC2, and the third_1 write command WC3_1, stored in the first host write buffer 210. The storage system may transmit the generated first merged write command MWC1 to the storage device through the data transmission manager. The host write buffer 200 may divide and store a write command larger than a remaining space by utilizing the first host write buffer 210 and the second host write buffer 220.

Figure 4D:
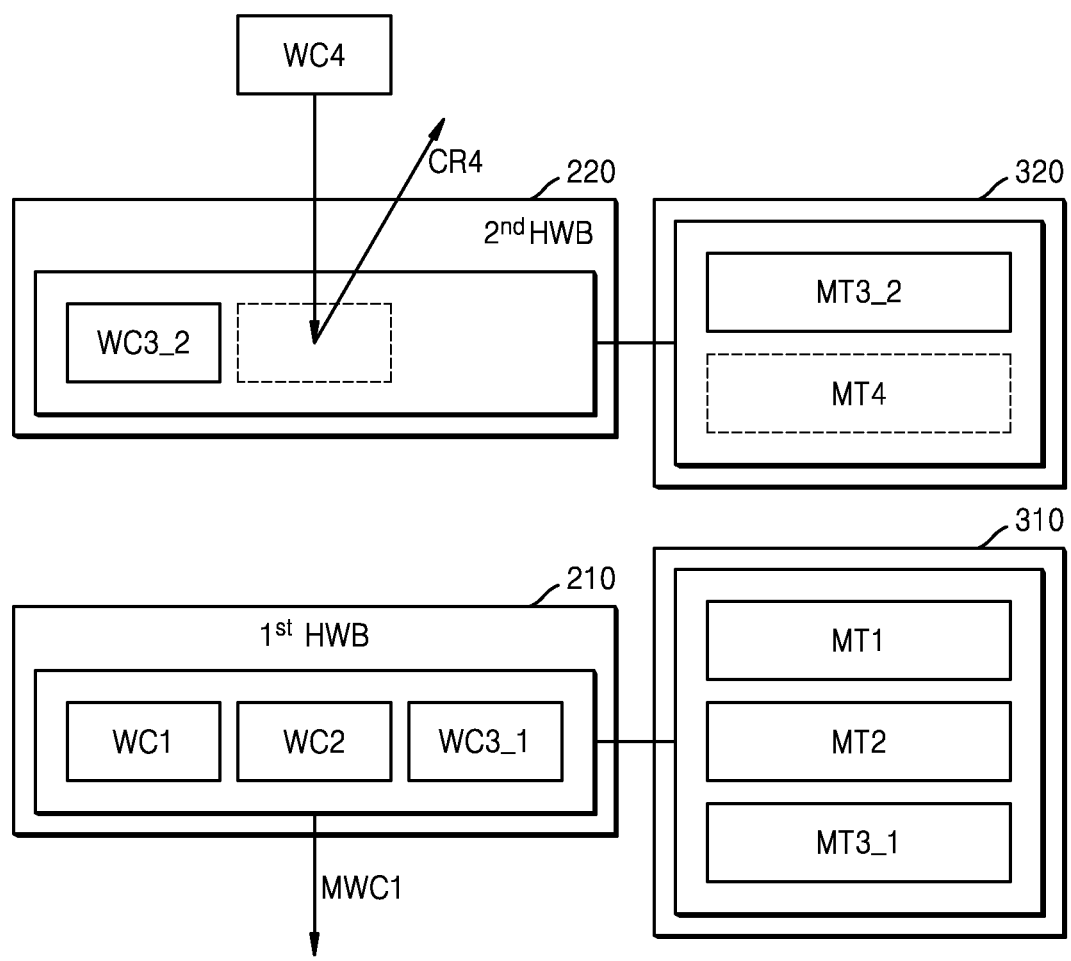

Referring to FIG. 4D, the host write buffer 200 may store a fourth write command WC4 received from the file system in the second host write buffer 220 while the first host write buffer 210 performs a write command merge and transmits the first merged write command MWC1. The storage system may use the first host write buffer 210 and the second host write buffer 220, and transmit the first merged write command MWC1 from the first host write buffer 210 and simultaneously receive other write commands from the file system through the second host write buffer 220 to store and merge the other write commands.

While the storage system processes the first metadata MT1, the second metadata MT2, and the third metadata, stored in the first meta buffer 310, the storage system may receive fourth metadata MT4 and store the fourth metadata MT4 in the second meta buffer 320.

Figure 5:
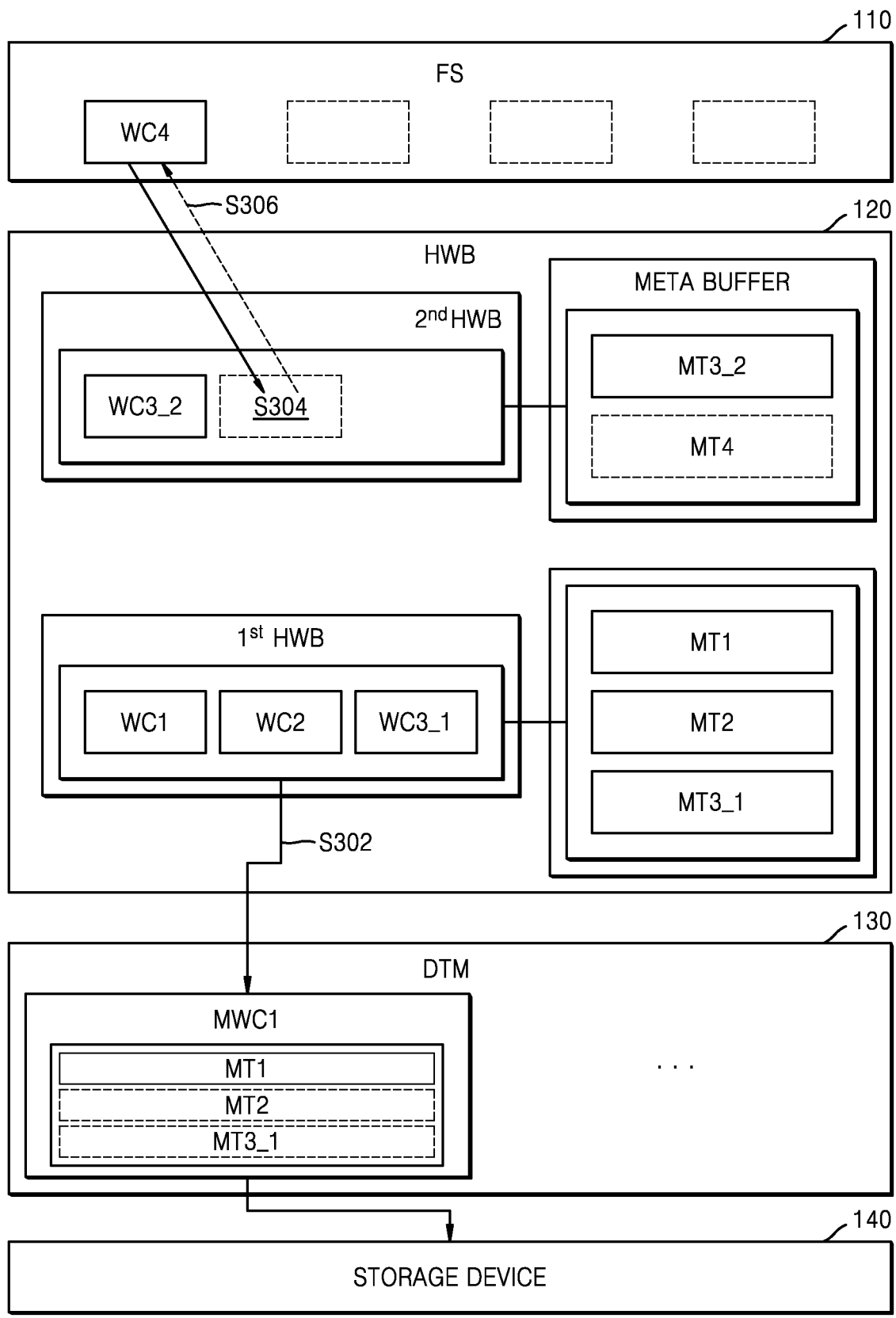
FIG. 5 is a conceptual diagram illustrating metadata transmission according to a merged write command in a storage system according to an embodiment of the present disclosure.

FIG. 5 illustrates metadata transmission according to a merged write command in a storage system according to an embodiment of the present disclosure.

When transmitting a merged write command from a host write buffer 120, the storage system may provide an interface utilizing an extra header segment (EHS) to transmit metadata including a logical block address and length information. The EHS will be supported from UFS specification 4.0 and may be used when an extra header is required in addition to a command header fixed to 32 bytes.

The EHS may include an EHS header and meta. The EHS header has a fixed size and may provide scalability in which multiple operations may be performed. The meta may vary depending on the total number of write commands merged in the host write buffer 120 and the type of write command to be used (e.g., WRITE 10 or WRITE 16). The EHS header may include fields for storing information on whether a merged write command is transmitted, the characteristics of logical block address and length information, whether meta transmission is required, a valid meta size setting, and the number of write commands merged in the host write buffer 120. The meta may include a field for storing a logical block address and length information for each write command.

The storage system may merge write commands stored in the host write buffer 120 and transmit a first merged write command MWC1 to a storage device 140 through a data transmission manager 130. Meta information corresponding to the first merged write command MWC1 may be transmitted to the storage device 140 through an EHS.

Figure 6:
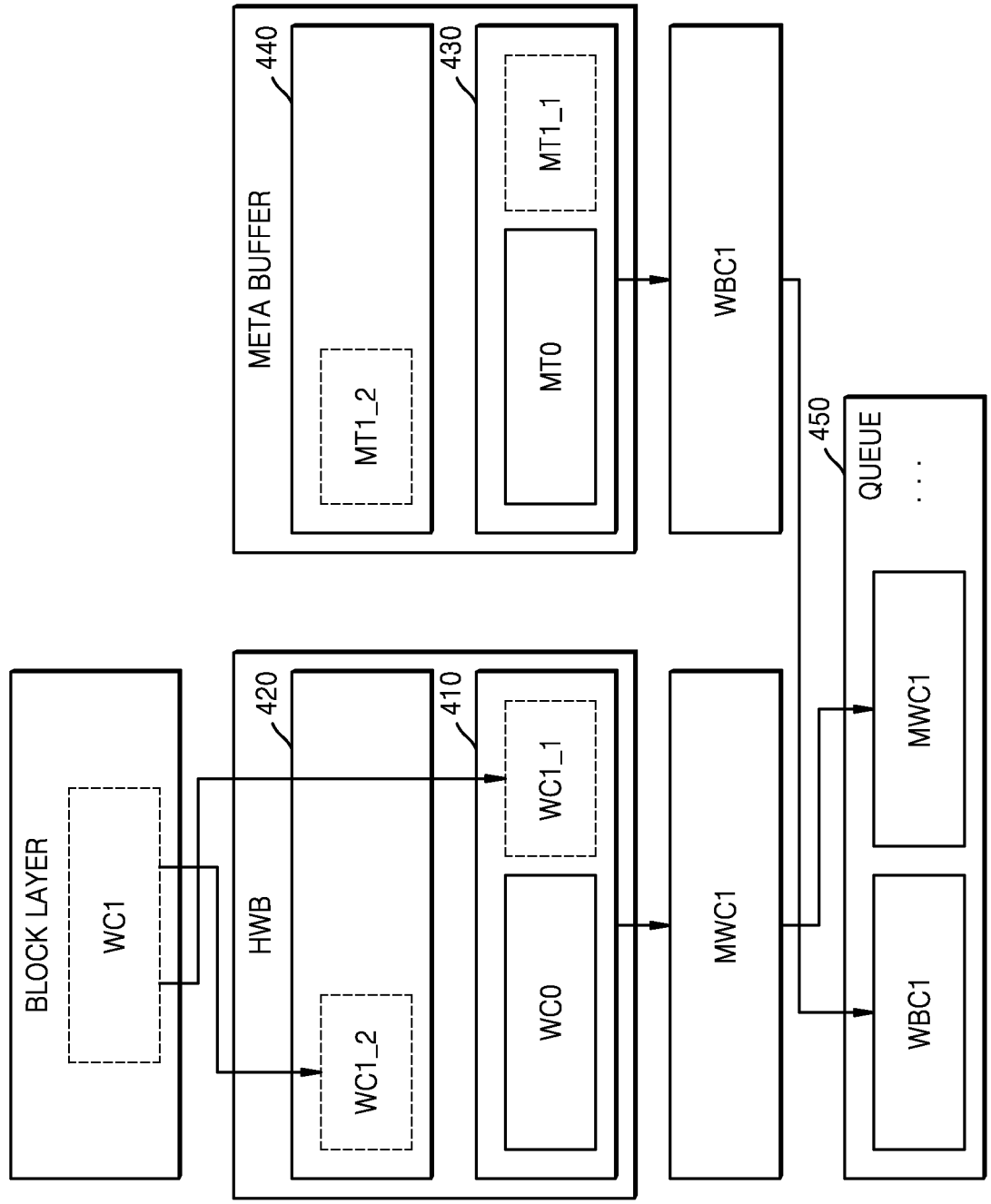
FIG. 6 is a conceptual diagram illustrating metadata transmission according to a merged write command in a storage system according to an embodiment of the present disclosure.

FIG. 6 illustrates metadata transmission according to a merged write command in a storage system according to an embodiment of the present disclosure.

The storage system may transmit meta information by using a separate vendor command or a write buffer command of UFS instead of using an EHS. For example, meta information may be transmitted using a first write buffer command WBC1, and a first merged write command MWC1 stored in a host write buffer may be transmitted. The storage system may first transmit the meta information through the first write buffer command WBC1 before the first merged write command MWC1, and thus, validity check for the logical block address and length information may be first performed.

Figure 7:
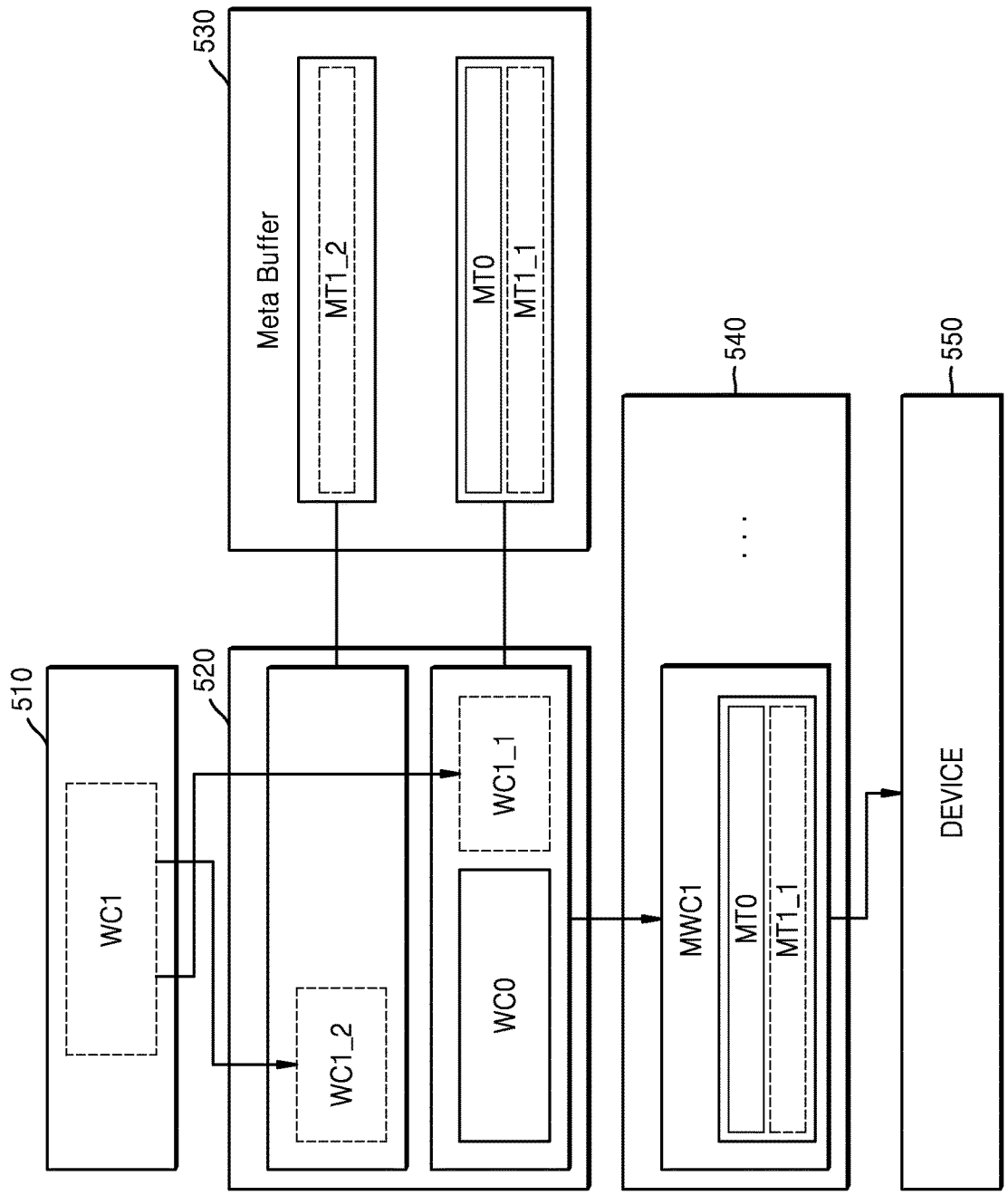
FIG. 7 is a conceptual diagram illustrating an operating method of a storage system, according to an embodiment of the present disclosure.

FIG. 7 illustrates an operating method of a storage system, according to an embodiment of the present disclosure.

Referring to FIG. 7, a zeroth write command WC0 and a first write command WC1 may be transmitted to a storage device 550 through a host write buffer 520 and a meta buffer 530. The zeroth write command WC0 and the first write command WC1 may be write commands having different sizes and addresses.

First, the zeroth write command WC0 having a logical block address of 0 and a length of 4 may be generated by a file system 510 and stored in the host write buffer 520, and a response to the zeroth write command WC0 may be transmitted to the file system 510. Zeroth meta information (a logical block address of 0 and a length of 4) may be stored in the meta buffer 530 corresponding to the host write buffer 520.

The storage system may store, in the host write buffer 520, the first write command WC1 having a logical block address of 10 and a length of 4. Because the size of the first write command WC1 is larger than a remaining space of a first host write buffer in the host write buffer 520, the first write command WC1 may be divided into a first_1 write command WC1_1 and a first_2 write command WC1_2. First_1 meta information MT1_1 corresponding to the first_1 write command WC1_1 may include a logical block address of 10 and a length of 2, first_2 meta information MT1_2 may include a logical block address of 12 and a length of 2, and the first_1 meta information MT1_1 and the first_2 meta information MT1_2 may be stored separately in a meta buffer area corresponding to the host write buffer 520.

A first merged write command MWC1 may be generated by merging the zeroth write command WC0 and the first_1 write command WC1_1, stored in the first host write buffer. Content stored in the meta buffer 530 corresponding to the first merged write command MWC1 may be transmitted through an EHS of the first merged write command MWC1.

When the first merged write command MWC1 is received, the storage device 550 may confirm that the first merged write command MWC1 is a command obtained by merging a plurality of write commands, through content stored in an EHS in a command parser. The storage device 550 may divide data corresponding to a write command in the first merged write command MWC1 and store the divided data in a non-volatile memory.

Figure 8:
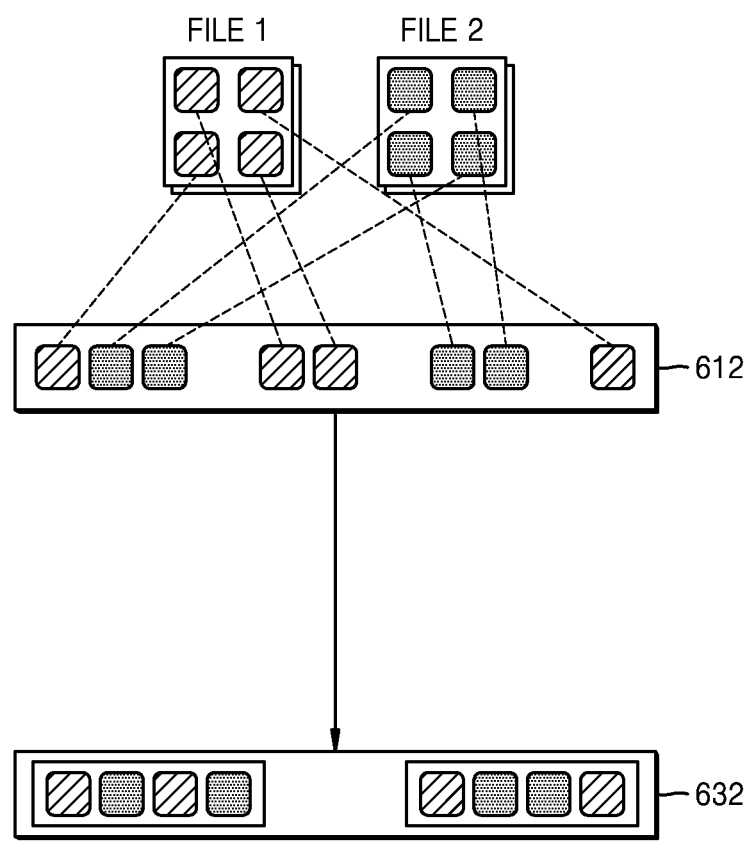
FIG. 8 is a conceptual diagram illustrating an operating method of a storage system supporting a multi-stream, according to an embodiment of the present disclosure.

FIG. 8 illustrates an operating method of a storage system supporting a multi-stream, according to an embodiment of the present disclosure.

The storage system may support a multi-stream including streams obtained by dividing the same file or data having properties with similar lifespan patterns. In the storage system, a host write buffer 620 may be separated for each stream. A storage device 630 may also divide data for each stream and store divided data.

Figure 9:
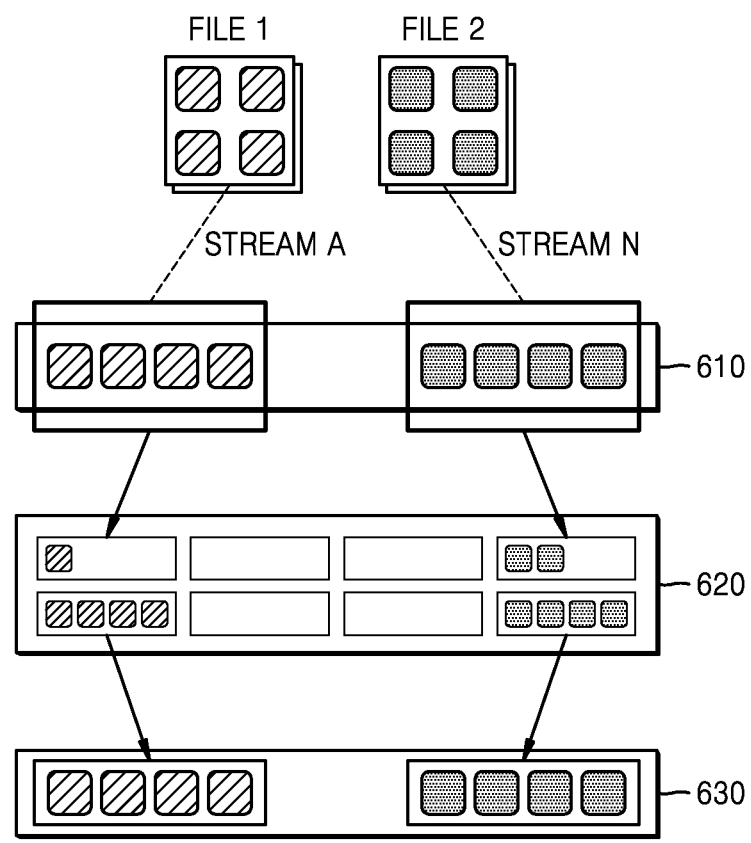
FIG. 9 is a conceptual diagram illustrating an operating method of a storage system that does not support a multi-stream, according to an embodiment of the present disclosure.

FIG. 9 illustrates an operating method of a storage system that does not support a multi-stream, according to an embodiment of the present disclosure.

Because a file system 612 generates a write command without distinguishing between a first file FILE 1 and a second file FILE 2, the first file FILE 1 and the second file FILE 2 are stored without distinction in a storage device 632.

Figure 10:
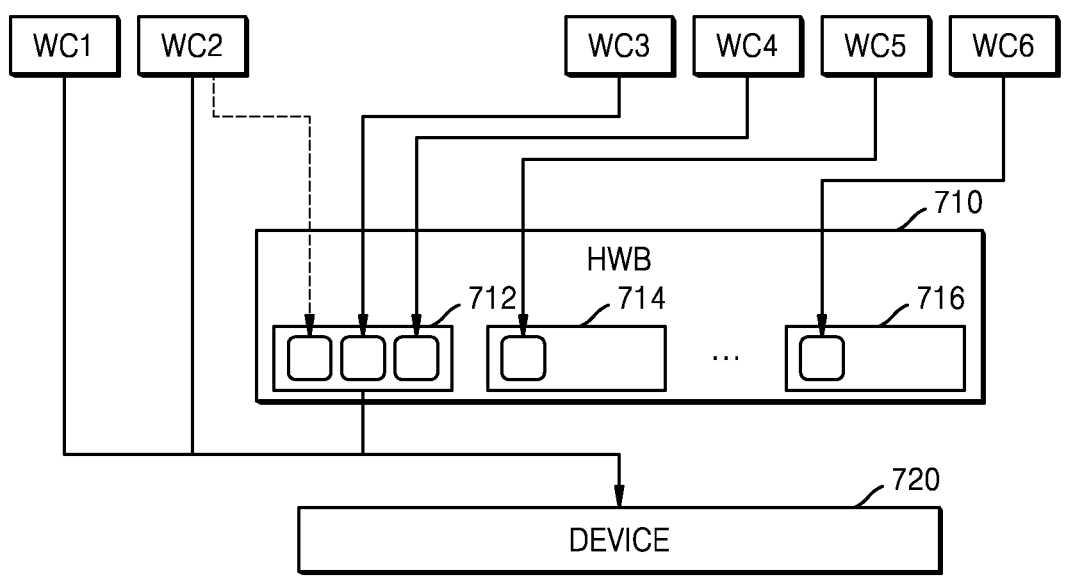
FIG. 10 is a conceptual diagram illustrating an operating method of a storage system supporting a multi-stream, according to an embodiment of the present disclosure.

FIG. 10 illustrates an operating method of a storage system supporting a multi-stream, according to an embodiment of the present disclosure.

Because a storage device 720 may not operate a host write buffer 710 for each stream due to resource limitations, a host may operate the host write buffer 710 for each stream and merge write data for each stream to transmit merged write data to the storage device 720. In the storage system, when a write command is transmitted, write data for each stream may be managed by using a stream ID as a delimiter.

For example, a stream ID of a first write command WC1 to a fourth write command WC4 may be A, a stream ID may not be assigned to a fifth write command WC5, and a stream ID of a sixth write command WC6 may be N.

A first host write buffer 712 may store data having a stream ID of A, a second host write buffer 714 may store data to which a stream ID is not assigned, and an Nth host write buffer 716 may store data having a stream ID of N.

When the first write command WC1 to the storage device 720 indicates a fast transmission, the storage system may directly transmit data to the storage device 720 without going through the host write buffer 710. The storage system may bypass the second write command WC2 and then store data in the host write buffer 710 and merge the stored data.

Figure 11:
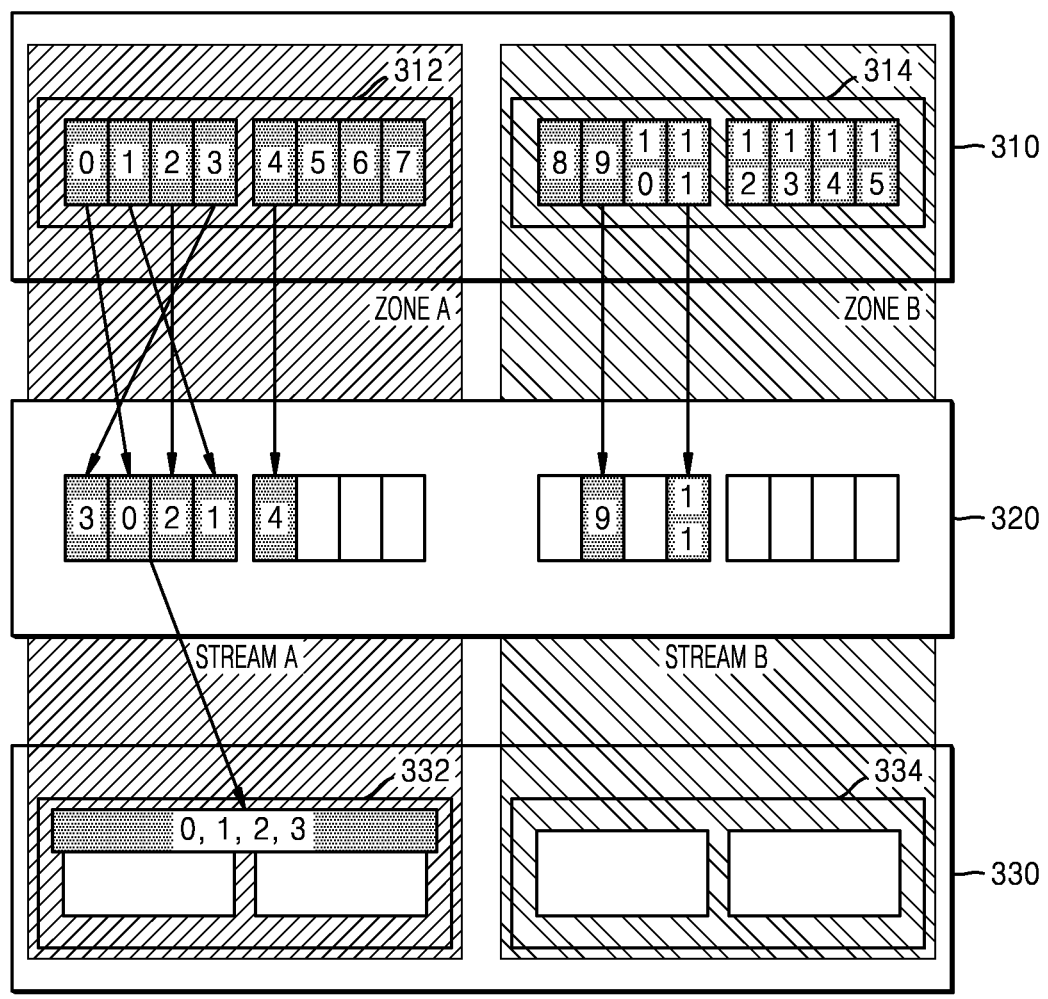
FIG. 11 is a conceptual diagram illustrating an operating method of a storage system supporting a zone-based interface, according to an embodiment of the present disclosure.

FIG. 11 illustrates an operating method of a storage system supporting a zone-based interface, according to an embodiment of the present disclosure.

A host write buffer 320 may be used in a zone storage system that supports a zone-based interface including zoned block commands (ZBC). For example, the zone storage system may generate the host write buffer 320 in a host to compensate for an insufficient buffer space in a zone storage device 330.

In the zone storage system, storage (e.g., non-volatile memory) may be logically divided into zones having a certain size. When a write command is provided from a host file system 310 of the zone storage system to the zone storage device 330, data of consecutive logical block addresses may be stored for each zone.

Write commands for consecutive logical block addresses may be generated in a zone A host file system 312 of the zone storage system. The generated write commands may be transmitted in reverse order by a scheduler of a block layer. In this case, the zone storage system may transmit, to the zone A storage device 332, meta information on non-consecutive logical block addresses together with a merged write command, and the zone A storage device 332 may check the meta information and arrange data of the non-consecutive logical block addresses into consecutive logical block addresses.

Figure 12:
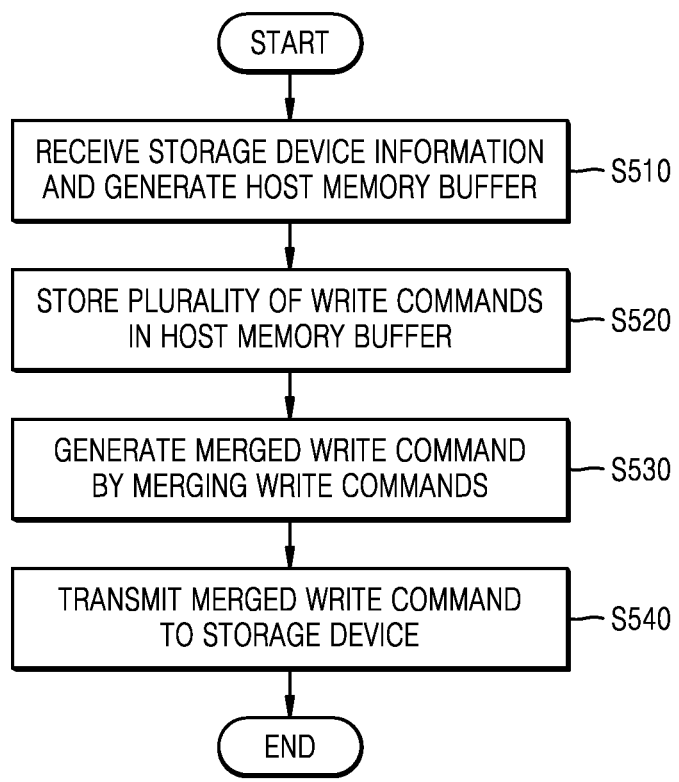
FIG. 12 is a flowchart diagram illustrating an operating method of a storage system, according to an embodiment of the present disclosure.

FIG. 12 illustrates an operating method of a storage system, according to an embodiment of the present disclosure.

The storage system may receive storage device information and generate a host write buffer (operation S510). The size of the host write buffer, may be allocated based on at least one of a program method of a storage device and a unit of interleaving processing for simultaneously processing, by several chips, a request received from a host. The host write buffer may include at least one of a first host write buffer and a second host write buffer based on an input/output scheduling method. The storage system may further include a meta-memory buffer for merging write commands for non-consecutive logical block addresses. The meta-memory buffer may be dynamically allocated according to the number of write commands merged in the host write buffer, and may store meta information including at least one of a logical block address and length information of data corresponding to each of the write commands. The storage system may generate an EHS including the meta information and transmit the generated EHS to the storage device.

The storage system may store a plurality of write commands in the host write buffer (operation S520). The storage system may generate a merged write command by merging the write commands (operation S530). The storage system may transmit the merged write command to the storage device (operation S540).

Figure 13:
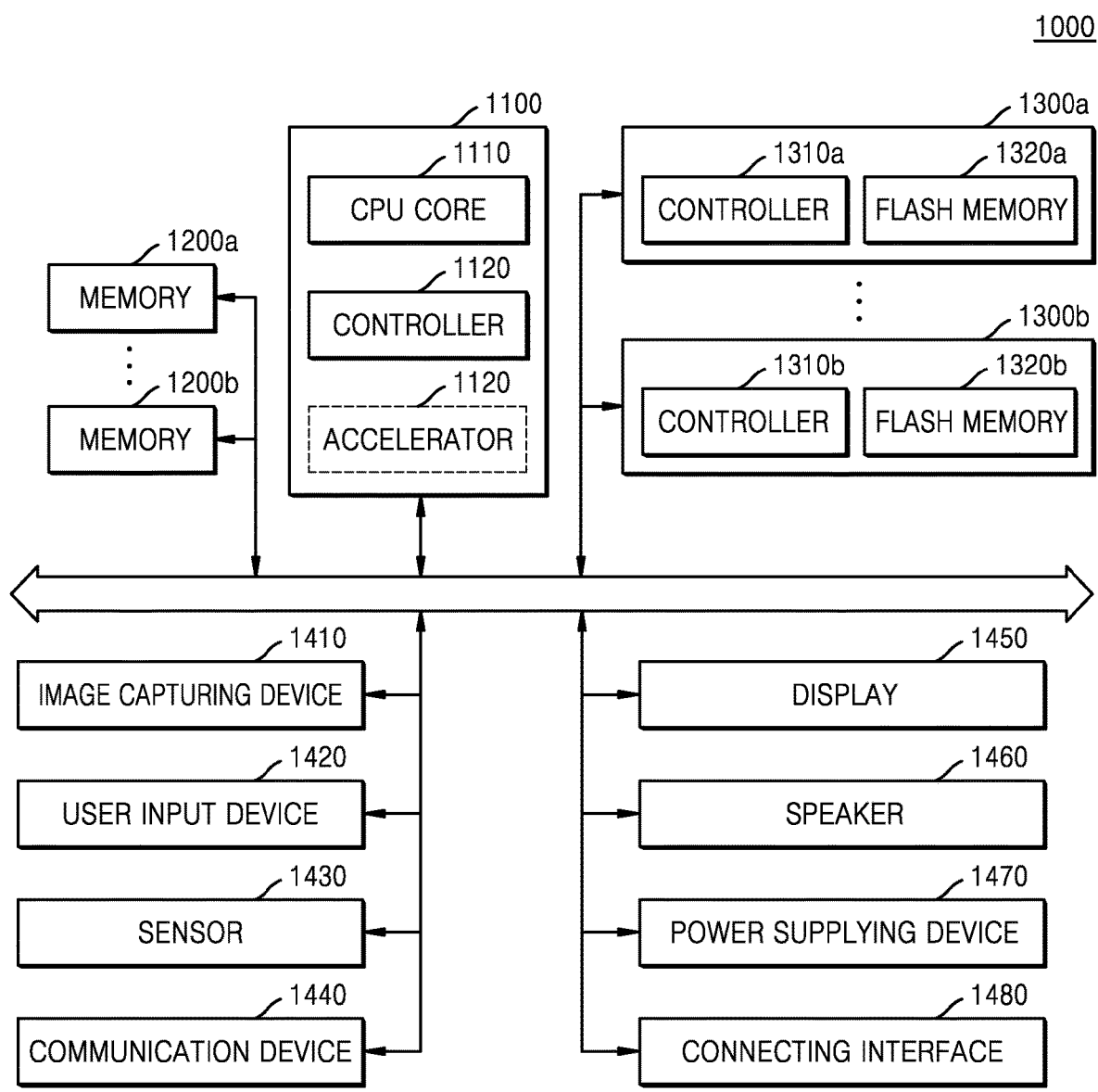
FIG. 13 is a block diagram illustrating a system to which a storage device according to an embodiment of the present disclosure is applied.

FIG. 13 illustrates a system 1000 to which a storage device according to an embodiment of the present disclosure is applied. The system 1000 of FIG. 13 may basically include a mobile system such as a mobile phone, a smart phone, a tablet PC, a wearable device, a healthcare device, or an Internet-of-things (IoT) device. However, the system 1000 of FIG. 13 is not limited to the mobile system and may also include a PC, a laptop computer, a server, a media player, or an automotive device such as a navigation device. Hereinafter, subscripts (e.g., a in 1200a and a in 1300a) attached to reference numbers are used to distinguish a plurality of circuits having the same function.

Referring to FIG. 13, the system 1000 may include a main processor 1100, memories 1200a and 1200b, and storage devices 1300a and 1300b and may additionally include one or more of an image capturing device 1410, a user input device 1420, a sensor 1430, a communication device 1440, a display 1450, a speaker 1460, a power supplying device 1470, and a connecting interface 1480.

The main processor 1100 may control overall operations of the system 1000, and more particularly, may control operations of other components constituting the system 1000. The main processor 1100 may be implemented by a general-purpose processor, a dedicated processor, an application processor, or the like.

The main processor 1100 may include one or more CPU cores 1110 and may further include a controller 1120 for controlling the memories 1200a and 1200b and/or the storage devices 1300a and 1300b. According to embodiments, the main processor 1100 may further include an accelerator block 1130, which is a dedicated circuit for high-speed data calculations such as artificial intelligence (AI) data calculations. The accelerator block 1130 may include a graphics processing unit (GPU), a neural processing unit (NPU), and/or a data processing unit (DPU), and may be implemented by a separate chip that is physically independent of the other components.

The memories 1200a and 1200b may be used as a main memory device and may include volatile memory such as static random access memory (SRAM) and/or dynamic random access memory (DRAM) or may include non-volatile memory such as phase change random access memory (PRAM) and/or resistive random access memory (RRAM). The memories 1200a and 1200b may also be implemented in the same package as the main processor 1100.

The storage devices 1300a and 1300b may function as non-volatile storage devices storing data regardless of the supply or not of power, and may have relatively larger storage capacities than the memories 1200a and 1200b. The storage devices 1300a and 1300b may include storage controllers 1310a and 1310b, and non-volatile storages 1320a and 1320b storing data under the control of the storage controllers 1310a and 1310b, respectively. The non-volatile storages 1320a and 1320b may include V-NAND flash memory having a 2-dimensional (2D) structure or a 3-dimensional (3D) structure or may include another type of non-volatile memory such as PRAM and/or RRAM.

The storage devices 1300a and 1300b may be included in the system 1000 while physically separated from the main processor 1100 or may be implemented in the same package as the main processor 1100. In addition, the storage devices 1300a and 1300b may have a form such as a memory card and thus may be detachably coupled to the other components of the system 1000 through an interface such as the connecting interface 1480 described below. The storage devices 1300a and 1300b may include, but are not limited to, devices to which standard specifications such as UFS are applied.

The image capturing device 1410 may capture still images or moving images and may include a camera, a camcorder, and/or a webcam.

The user input device 1420 may receive various types of data input by a user of the system 1000 and may include a touch pad, a keypad, a keyboard, a mouse, and/or a microphone.

The sensor 1430 may sense various physical quantities, which may be obtained from outside the system 1000, and may convert the sensed physical quantities into electrical signals. The sensor 1430 may include a temperature sensor, a pressure sensor, a luminance sensor, a position sensor, an acceleration sensor, a biosensor, and/or a gyroscope.

The communication device 1440 may perform transmission and reception of signals between the system 1000 and other devices outside the system 1000, according to various communication protocols. The communication device 1440 may include an antenna, a transceiver, and/or a modem.

The display 1450 and the speaker 1460 may function as output devices outputting visual information and auditory information to the user of the system 1000, respectively.

The power supplying device 1470 may appropriately convert power supplied by a battery (not shown) embedded in the system 1000 and/or by an external power supply and thus supply the converted power to each of the components of the system 1000.

The connecting interface 1480 may provide a connection between the system 1000 and an external device that is connected to the system 1000 and capable of exchanging data with the system 1000. The connecting interface 1480 may be implemented by various interfaces such as Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), non-volatile memory express (NVMe), IEEE 1394, universal serial bus (USB), a secure digital (SD) card interface, a multi-media card (MMC) interface, an eMMC interface, UFS, embedded Universal Flash Storage (eUFS), and a CF card interface.

Figure 14:
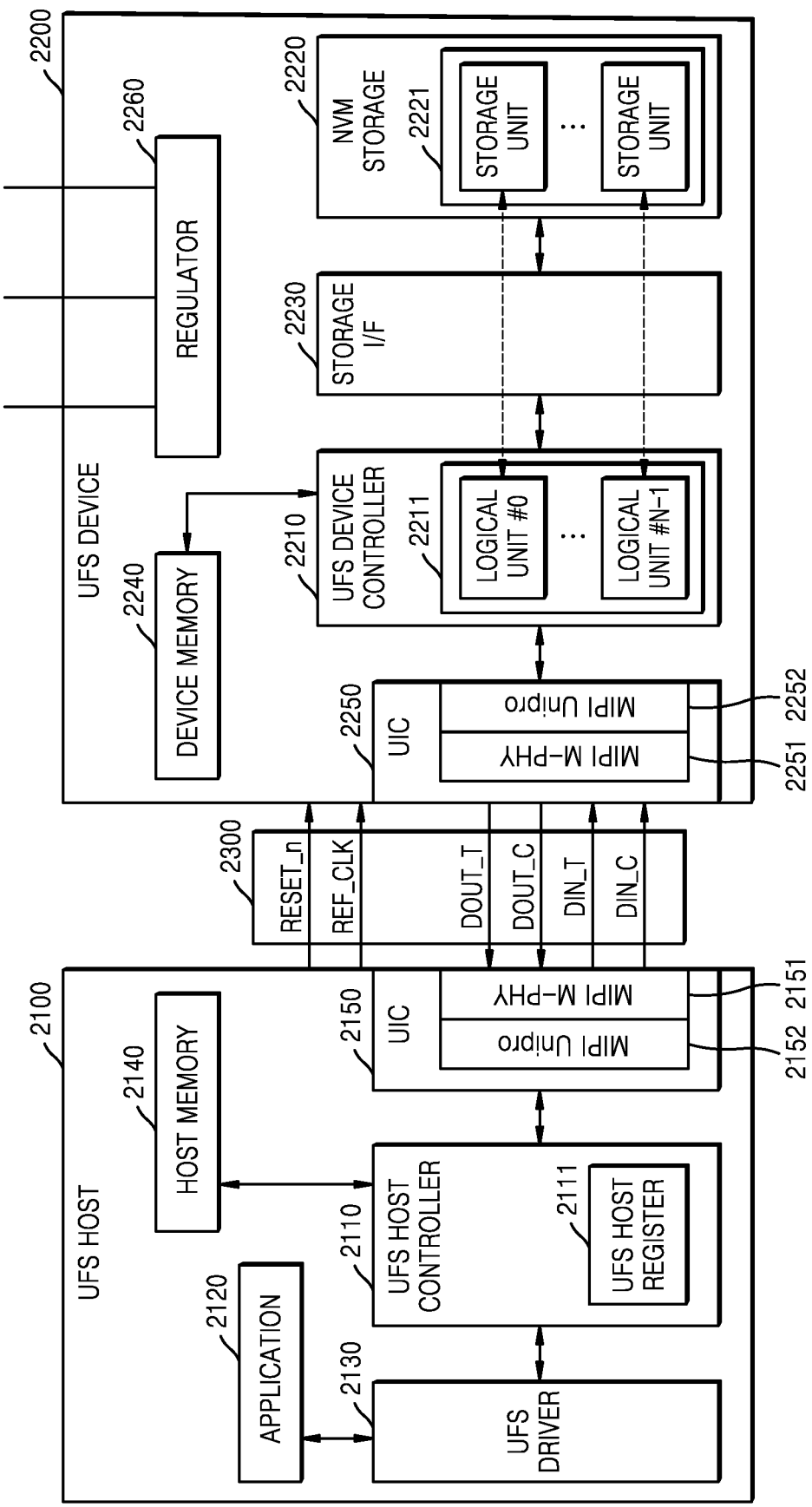
FIG. 14 is a block diagram illustrating a universal flash storage (UFS) system according to an embodiment of the present disclosure.

FIG. 14 illustrates a UFS system 2000 according to an embodiment of the present disclosure. The UFS system 2000, which is a system conforming to the UFS standard announced by the Joint Electron Device Engineering Council (JEDEC), may include a UFS host 2100, a UFS device 2200, and a UFS interface 2300. The above descriptions of the system 1000 of FIG. 13 may also be applied to the UFS system 2000 of FIG. 14 unless conflicting with the following descriptions regarding FIG. 14.

Referring to FIG. 14, the UFS host 2100 and the UFS device 2200 may be connected to each other through the UFS interface 2300. When the main processor 1100 of FIG. 13 is an application processor, the UFS host 2100 may be implemented as a portion of a corresponding application processor. A UFS host controller 2110 and a host memory 2140 may respectively correspond to the controller 1120 and the memories 1200a and 1200b of the main processor 1100 of FIG. 13. The UFS device 2200 may correspond to the storage devices 1300a and 1300b of FIG. 13, and a UFS device controller 2210 and a non-volatile storage 2220 may respectively correspond to the storage controllers 1310a and 1310b and the non-volatile storages 1320a and 1320b in FIG. 13.

The UFS host 2100 may include the UFS host controller 2110, an application 2120, a UFS driver 2130, the host memory 2140, and a UFS interconnect (UIC) layer 2150. The UFS device 2200 may include the UFS device controller 2210, the non-volatile storage 2220, a storage interface 2230, a device memory 2240, a UIC layer 2250, and a regulator 2260. The non-volatile storage 2220 may include a plurality of storage units 2221, and each storage unit 2221 may include V-NAND flash memory having a 2D structure or a 3D structure or may include another type of non-volatile memory such as PRAM and/or RRAM. The UFS device controller 2210 and the non-volatile storage 2220 may be connected to each other through the storage interface 2230. The storage interface 2230 may be implemented to conform to a standard specification such as Toggle or ONFI.

The application 2120 may refer to a program that intends to communicate with the UFS device 2200 to use a function of the UFS device 2200. The application 2120 may transmit an input-output request to the UFS driver 2130 to perform input to and output from the UFS device 2200. The input-output request may refer to, but is not limited to, a read request, a write request, and/or a discard request of data.

The UFS driver 2130 may manage the UFS host controller 2110 through a UFS-host controller interface (HCI). The UFS driver 2130 may convert the input-output request generated by the application 2120 into a UFS command defined by the UFS standard, and may transfer the converted UFS command to the UFS host controller 2110. One input-output request may be converted into a plurality of UFS commands. Although a UFS command may be basically a command defined by the SCSI standard, the UFS command may also be a UFS standard-dedicated command.

The UFS host controller 2110 may transmit the UFS command converted by the UFS driver 2130 to the UIC layer 2250 of the UFS device 2200 through the UIC layer 2150 and the UFS interface 2300. In this process, a UFS host register 2111 of the UFS host controller 2110 may perform a role as a command queue.

The UIC layer 2150 of the UFS host 2100 may include MIPI M-PHY 2151 and MIPI UniPro 2152, and the UIC layer 2250 of the UFS device 2200 may also include MIPI M-PHY 2251 and MIPI UniPro 2252.

The UFS interface 2300 may include a line for transmitting a reference clock signal REF_CLK, a line for transmitting a hardware reset signal RESET_n with respect to the UFS device 2200, a pair of lines for transmitting a differential input signal pair DIN_T and DIN_C, and a pair of lines for transmitting a differential output signal pair DOUT_T and DOUT_C.

A frequency value of the reference clock signal REF_CLK provided from the UFS host 2100 to the UFS device 2200 may be, but is not limited to, one of 19.2 MHz, 26 MHz, 38.4 MHz, and 52 MHz. Even while the UFS host 2100 is being operated, that is, even while data transmission and reception between the UFS host 2100 and the UFS device 2200 is being performed, the frequency value of the reference clock signal REF_CLK may be changed. The UFS device 2200 may generate clock signals having various frequencies from the reference clock signal REF_CLK received from the UFS host 2100, by using a phase-locked loop (PLL) or the like. In addition, the UFS host 2100 may also set a value of a data rate between the UFS host 2100 and the UFS device 2200, based on the frequency value of the reference clock signal REF_CLK. That is, the value of the data rate may be determined according to the frequency value of the reference clock signal REF_CLK.

The UFS interface 2300 may support a plurality of lanes, and each lane may be implemented by a differential pair. For example, a UFS interface may include one or more reception lanes and one or more transmission lanes. In FIG. 14, the pair of lines for transmitting the differential input signal pair DIN_T and DIN_C may constitute a reception lane, and the pair of lines for transmitting the differential output signal pair DOUT_T and DOUT_C may constitute a transmission lane. Although one transmission lane and one reception lane are illustrated in FIG. 14, the respective numbers of transmission lanes and reception lanes may be changed.

The reception lane and the transmission lane may transfer data in a serial communication manner, and full-duplex type communication between the UFS host 2100 and the UFS device 2200 may be allowed due to a structure in which the reception lane is separated from the transmission lane. That is, even while receiving data from the UFS host 2100 through the reception lane, the UFS device 2200 may transmit data to the UFS host 2100 through the transmission lane. In addition, control data such as a command from the UFS host 2100 to the UFS device 2200, and user data, which the UFS host 2100 intends to store in the non-volatile storage 2220 of the UFS device 2200 or to read from the non-volatile storage 2220, may be transferred through the same lane. Accordingly, there is no need to further arrange, between the UFS host 2100 and the UFS device 2200, a separate lane for data transfer, in addition to a pair of reception lanes and a pair of transmission lanes.

The UFS device controller 2210 of the UFS device 2200 may take overall control of operations of the UFS device 2200. The UFS device controller 2210 may manage the non-volatile storage 2220 through a logical unit (LU) 2211, which is a logical data storage unit. The number of LUs 2211 may be, but is not limited to, 8. The UFS device controller 2210 may include a flash translation layer (FTL) and, by using address mapping information of the FTL, may convert a logical data address, for example, a logical block address (LBA), which is transferred from the UFS host 2100, into a physical data address, for example, a physical block address (PBA). In the UFS system 2000, a logical block for storing user data may have a size in a certain range. For example, a minimum size of the logical block may be set to be 4 Kbyte.

When a command from the UFS host 2100 is input to the UFS device 2200 through the UIC layer 2250, the UFS device controller 2210 may perform an operation according to the input command, and when the operation is completed, the UFS device controller 2210 may transmit a completion response to the UFS host 2100.

For example, when the UFS host 2100 intends to store user data in the UFS device 2200, the UFS host 2100 may transmit a data storage command to the UFS device 2200. When a response indicative of being ready to receive the user data is received from the UFS device 2200, the UFS host 2100 may transmit the user data to the UFS device 2200. The UFS device controller 2210 may temporarily store the received user data in the device memory 2240 and, based on the address mapping information of the FTL, may store the user data temporarily stored in the device memory 2240 in a selected location of the non-volatile storage 2220.

As another example, when the UFS host 2100 intends to read the user data stored in the UFS device 2200, the UFS host 2100 may transmit a data read command to the UFS device 2200. The UFS device controller 2210 having received the data read command may read the user data from the non-volatile storage 2220, based on the data read command, and may temporarily store the read user data in the device memory 2240. In this data read process, the UFS device controller 2210 may detect and correct an error in the read user data, by using an embedded error correction code (ECC) circuit (not shown). In addition, the UFS device controller 2210 may transmit the user data temporarily stored in the device memory 2240 to the UFS host 2100. Further, the UFS device controller 2210 may further include an advanced encryption standard (AES) circuit (not shown), and the AES circuit may encrypt or decrypt data, which is input to the UFS device controller 2210, by using a symmetric-key algorithm.

The UFS host 2100 may store commands, which is to be transmitted to the UFS device 2200, in the UFS host register 2111 capable of functioning as a command queue according to an order, and may transmit the commands to the UFS device 2200 in the order. Here, even when a previously transmitted command is still being processed by the UFS device 2200, that is, even before the UFS host 2100 receives a notification indicating that processing of the previously transmitted command is completed by the UFS device 2200, the UFS host 2100 may transmit the next command on standby in the command queue to the UFS device 2200, and thus, the UFS device 2200 may also receive the next command from the UFS host 2100 even while processing the previously transmitted command. The maximum number of commands capable of being stored in the command queue (that is, a queue depth) may be, for example, 32. In addition, the command queue may be implemented by a circular queue type in which a start and an end of a command sequence stored in a queue are respectively indicated by a head pointer and a tail pointer.

Each of the plurality of storage units 2221 may include a memory cell array and a control circuit for controlling an operation of the memory cell array. The memory cell array may include a 2D memory cell array or a 3D memory cell array. The memory cell array may include a plurality of memory cells, and each memory cell may be a single level cell (SLC) storing 1 bit of information or may be a cell storing 2 or more bits of information, such as a multi-level cell (MLC), a triple level cell (TLC), or a quadruple level cell (QLC). The 3D memory cell array may include a vertical NAND string vertically oriented such that at least one memory cell is located on another memory cell.

VCC, VCCQ1, VCCQ2, or the like may be input as a power supply voltage to the UFS device 2200. VCC, which is a main power supply voltage for the UFS device 2200, may have a value of about 2.4 V to about 3.6 V. VCCQ1, which is a power supply voltage for supplying a voltage in a low-voltage range, is mainly for the UFS device controller 2210 and may have a value of about 1.14 V to about 1.26 V. VCCQ2, which is a power supply voltage for supplying a voltage in a range higher than VCCQ1 and lower than VCC, is mainly for an input-output interface such as the MIPI M-PHY 2251 and may have a value of about 1.7 V to about 1.95 V. The power supply voltages set forth above may be supplied for the respective components of the UFS device 2200 through the regulator 2260. The regulator 2260 may be implemented by a set of unit regulators respectively connected to different ones of the power supply voltages set forth above.

Figure 15:
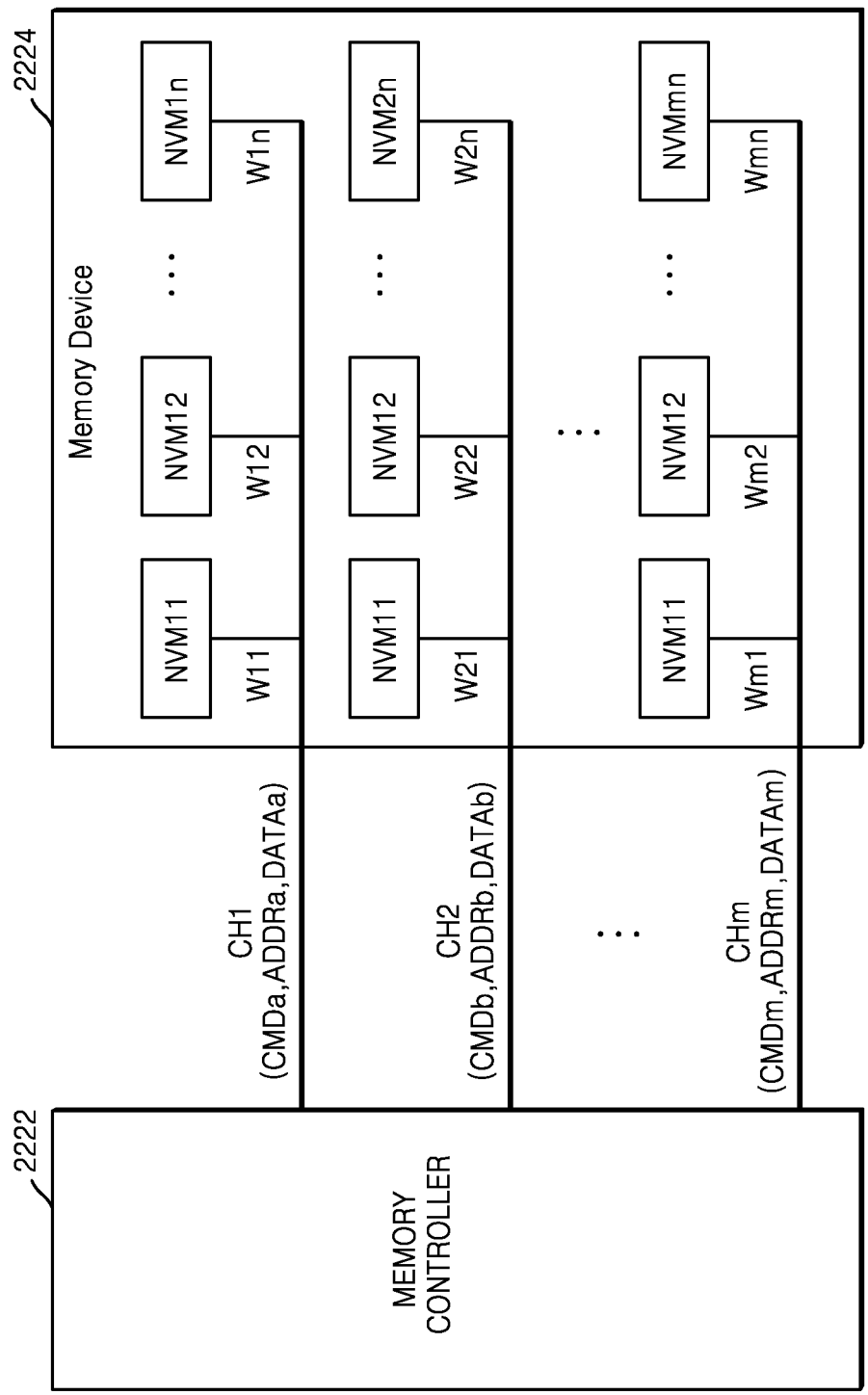
FIG. 15 is a block diagram of a non-volatile storage according to an embodiment of the present disclosure.

FIG. 15 illustrates a non-volatile storage 2220a according to an embodiment of the present disclosure.

Referring to FIG. 15, the non-volatile storage 2220a may include a memory device 2224 and a memory controller 2222. The non-volatile storage 2220a may support a plurality of channels CH1 to CHm, and the memory device 2224 may be connected to the memory controller 2222 through the plurality of channels CH1 to CHm. For example, the non-volatile storage 2220a may be implemented as a storage device such as a solid state drive (SSD).

The memory device 2224 may include a plurality of non-volatile memory devices NVM11 to NVMmn. Each of the non-volatile memory devices NVM11 to NVMmn may be connected to one of the plurality of channels CH1 to CHm through a corresponding way. For example, the non-volatile memory devices NVM11 to NVM1$n$ may be respectively connected to a first channel CH1 through ways W11 to W1$n$, and the non-volatile memory devices NVM21 to NVM2$n$ may be respectively connected to a second channel CH2 through ways W21 to W2$n$. In an example embodiment, each of the non-volatile memory devices NVM11 to NVMmn may be implemented by any memory unit capable of operating according to an individual command from the memory controller 2222. For example, although each of the non-volatile memory devices NVM11 to NVMmn may be implemented by a chip or a die, the present disclosure is not limited thereto.

The memory controller 2222 may transmit signals to and receive signals from the memory device 2224 through the plurality of channels CH1 to CHm. For example, the memory controller 2222 may transmit commands CMDa to CMDm, addresses ADDRa to ADDRm, and data DATAa to DATAm to the memory device 2224 through the channels CH1 to CHm or may receive the data DATAa to DATAm from the memory device 2224.

The memory controller 2222 may select, through each channel, one of the non-volatile memory devices connected to the corresponding channel and may transmit signals to and receive signals from the selected non-volatile memory device. For example, the memory controller 2222 may select a non-volatile memory device NVM11 from among the non-volatile memory devices NVM11 to NVM1$n$ connected to the first channel CH1. The memory controller 2222 may transmit the command CMDa, the address ADDRa, and the data DATAa to the selected non-volatile memory device NVM11 or may receive the data DATAa from the selected non-volatile memory device NVM11, through the first channel CH1.

The memory controller 2222 may transmit signals to and receive signals from the memory device 2224 in parallel through different channels. For example, the memory controller 2222 may transmit the command CMDb to the memory device 2224 through the second channel CH2 while transmitting the command CMDa to the memory device 2224 through the first channel CH1. For example, the memory controller 2222 may receive the data DATAb from the memory device 2224 through the second channel CH2 while receiving the data DATAa from the memory device 2224 through the first channel CH1.

The memory controller 2222 may control overall operations of the memory device 2224. The memory controller 2222 may control each of the non-volatile memory devices NVM11 to NVMmn connected to the channels CH1 to CHm by transmitting signals to the channels CH1 to CHm. For example, the memory controller 2222 may control one selected from among the non-volatile memory devices NVM11 to NVM1$n$ by transmitting the command CMDa and the address ADDRa to the first channel CH1.

Each of the non-volatile memory devices NVM11 to NVMmn may be operated according to control by the memory controller 2222. For example, the non-volatile memory device NVM11 may program the data DATAa according to the command CMDa, the address ADDRa, and the data DATAa, which are provided to the first channel CH1. For example, the non-volatile memory device NVM21 may read the data DATAb according to the command CMDb and the address ADDRb, which are provided to the second channel CH2, and may transmit the read data DATAb to the memory controller 2222.

Although FIG. 15 illustrates that the memory device 2224 communicates with the memory controller 2222 through m channels and includes n non-volatile memory devices in correspondence with each channel, the number of channels and the number of non-volatile memory devices connected to a single channel may be variously changed.

Figure 16:
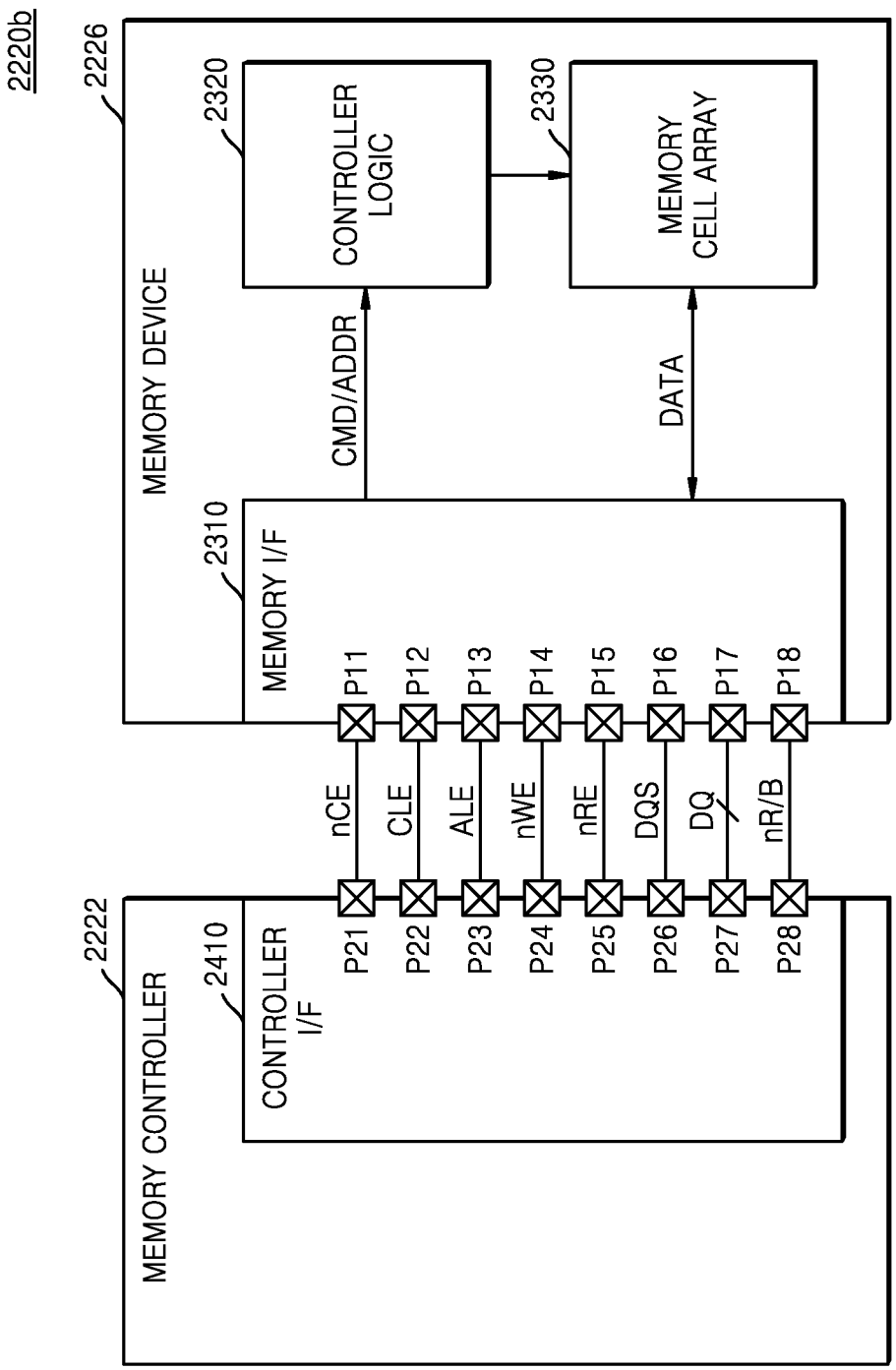
FIG. 16 is a block diagram of a non-volatile storage according to an embodiment of the present disclosure.

FIG. 16 illustrates a non-volatile storage 2220b according to an embodiment of the present disclosure. Referring to FIG. 16, the non-volatile storage 2220b may include a memory device 2226 and a memory controller 800. The memory device 2226 may correspond to one of the non-volatile memory devices NVM11 to NVMmn communicating with the memory controller 2222 based on one of the first to m-th channels CH1 to CHm in FIG. 15. The memory controller 2222 may correspond to the memory controller 2222 in FIG. 15.

The memory device 2226 may include first to eighth pins P11 to P18, a memory interface circuit 2310, a control logic circuit 2320, and a memory cell array 2330.

The memory interface circuit 2310 may receive a chip enable signal nCE from the memory controller 2222 through the first pin P11. The memory interface circuit 2310 may transmit signals to and receive signals from the memory controller 2222 through the second to eighth pins P12 to P18 according to the chip enable signal nCE. For example, when the chip enable signal nCE is in an enabled state (for example, a low level), the memory interface circuit 2310 may transmit signals to and receive signals from the memory controller 2222 through the second to eighth pins P12 to P18.

The memory interface circuit 2310 may receive a command latch enable signal CLE, an address latch enable signal ALE, and a write enable signal nWE from the memory controller 2222 through the second to fourth pins P12 to P14, respectively. The memory interface circuit 2310 may receive a data signal DQ from the memory controller 2222 or may transmit the data signal DQ to the memory controller 2222, through the seventh pin P17. A command CMD, an address ADDR, and data DATA may be transferred through the data signal DQ. For example, the data signal DQ may be transferred through a plurality of data signal lines. In this case, the seventh pin P17 may include a plurality of pins corresponding to a plurality of data signals.

The memory interface circuit 2310 may obtain the command CMD from the data signal DQ received in an enabled period (for example, a high-level state) of the command latch enable signal CLE, based on toggle timings of the write enable signal nWE. The memory interface circuit 2310 may obtain the address ADDR from the data signal DQ received in an enabled period (for example, a high-level state) of the address latch enable signal ALE, based on the toggle timings of the write enable signal nWE.

In an example embodiment, the write enable signal nWE may be maintained in a static state (for example, a high level or a low level) and then may toggle between the high level and the low level. For example, the write enable signal nWE may toggle in a period in which the command CMD or the address ADDR is transmitted. Accordingly, the memory interface circuit 2310 may obtain the command CMD or the address ADDR, based on the toggle timings of the write enable signal nWE.

The memory interface circuit 2310 may receive a read enable signal nRE from the memory controller 2222 through the fifth pin P15. The memory interface circuit 2310 may receive a data strobe signal DQS from the memory controller 2222 or transmit the data strobe signal DQS to the memory controller 2222, through the sixth pin P16.

In a data output operation of the memory device 2226, the memory interface circuit 2310 may receive the read enable signal nRE that toggles, through the fifth pin P15, before the data DATA is output. The memory interface circuit 2310 may generate the data strobe signal DQS that toggles, based on the toggling of the read enable signal nRE. For example, the memory interface circuit 2310 may generate the data strobe signal DQS starting to toggle after a preset delay (for example, tDQSRE) from a toggling start time of the read enable signal nRE. The memory interface circuit 2310 may transmit the data signal DQ including the data DATA, based on a toggle timing of the data strobe signal DQS. Accordingly, the data DATA may be transmitted to the memory controller 2222 in alignment with the toggle timing of the data strobe signal DQS.

In a data input operation of the memory device 2226, when the data signal DQ including the data DATA is received from the memory controller 2222, the memory interface circuit 2310 may receive the data strobe signal DQS that toggles, together with the data DATA, from the memory controller 2222. The memory interface circuit 2310 may obtain the data DATA from the data signal DQ, based on the toggle timing of the data strobe signal DQS. For example, the memory interface circuit 2310 may obtain the data DATA by sampling the data signal DQ at a rising edge and a falling edge of the data strobe signal DQS.

The memory interface circuit 2310 may transmit a ready/busy output signal nR/B to the memory controller 2222 through the eighth pin P18. The memory interface circuit 2310 may transmit state information of the memory device 2226 to the memory controller 2222 through the ready/busy output signal nR/B. When the memory device 2226 is in a busy state (that is, when internal operations of the memory device 2226 are being performed), the memory interface circuit 2310 may transmit, to the memory controller 2222, the ready/busy output signal nR/B indicating the busy state. When the memory device 2226 is in a ready state (that is, when the internal operations of the memory device 2226 are not being performed or are completed), the memory interface circuit 2310 may transmit, to the memory controller 2222, the ready/busy output signal nR/B indicating the ready state. For example, while the memory device 2226 reads the data DATA from the memory cell array 2330 in response to a page read command, the memory interface circuit 2310 may transmit, to the memory controller 2222, the ready/busy output signal nR/B indicating the busy state (for example, a low level). For example, while the memory device 2226 programs the data DATA into the memory cell array 2330 in response to a program command, the memory interface circuit 2310 may transmit, to the memory controller 2222, the ready/busy output signal nR/B indicating the busy state (for example, a low level).

The control logic circuit 2320 may generally control various operations of the memory device 2226. The control logic circuit 2320 may receive a command/address CMD/ADDR obtained from the memory interface circuit 2310. The control logic circuit 2320 may generate control signals for controlling the other components of the memory device 2226, according to the received command/address CMD/ADDR. For example, the control logic circuit 2320 may generate various control signals for programming the data DATA into the memory cell array 2330 or reading the data DATA from the memory cell array 2330.

The memory cell array 2330 may store the data DATA obtained from the memory interface circuit 2310, according to control by the control logic circuit 2320. The memory cell array 2330 may output the stored data DATA to the control logic circuit 2320, according to control by the control logic circuit 2320.

The memory cell array 2330 may include a plurality of memory cells. For example, the plurality of memory cells may include flash memory cells. However, the present disclosure is not limited thereto, and the memory cells may include RRAM cells, ferroelectric random access memory (FRAM) cells, PRAM cells, thyristor random access memory (TRAM) cells, or magnetic random access memory (MRAM) cells. Hereinafter, an embodiment of the present disclosure, in which the memory cells are NAND flash memory cells, will be mainly described.

The memory controller 2222 may include first to eighth pins P21 to P28 and a controller interface circuit 2410. The first to eighth pins P21 to P28 may respectively correspond to the first to eighth pins P11 to P18 of the memory device 2226.

The controller interface circuit 2410 may transmit the chip enable signal nCE to the memory device 2226 through the first pin P21. The controller interface circuit 2410 may transmit signals to and receive signals from the memory device 2226, which is selected through the chip enable signal nCE, through the second to eighth pins P22 to P28.

The controller interface circuit 2410 may transmit the command enable signal CLE, the address latch enable signal ALE, and the write enable signal nWE to the memory device 2226 through the second to fourth pins P22 to P24. The controller interface circuit 2410 may transmit the data signal DQ to the memory device 2226 or receive the data signal DQ from the memory device 2226, through the seventh pin P27.

The controller interface circuit 2410 may transmit the data signal DQ including the command CMD or the address ADDR, together with the write enable signal nWE that is toggling, to the memory device 2226. The controller interface circuit 2410 may transmit the data signal DQ including the command CMD according to transmitting the command latch enable signal CLE having an enabled state, and the controller interface circuit 2410 may transmit the data signal DQ including the address ADDR according to transmitting the address latch enable signal ALE having an enabled state.

The controller interface circuit 2410 may transmit the read enable signal nRE to the memory device 2226 through the fifth pin P25. The controller interface circuit 2410 may receive the data strobe signal DQS from the memory device 2226 or transmit the data strobe signal DQS to the memory device 2226, through the sixth pin P26.

In a data output operation of the memory device 2226, the controller interface circuit 2410 may generate the read enable signal nRE that toggles, and may transmit the read enable signal nRE to the memory device 2226. For example, the controller interface circuit 2410 may generate the read enable signal nRE, which changes from a static state (for example, a high level or a low level) to a toggle state, before the data DATA is output. Accordingly, in the memory device 2226, the data strobe signal DQS toggling based on the read enable signal nRE may be generated. The controller interface circuit 2410 may receive the data signal DQ including the data DATA, together with the data strobe signal DQS that toggles, from the memory device 2226. The controller interface circuit 2410 may obtain the data DATA from the data signal DQ, based on the toggle timing of the data strobe signal DQS.

In a data input operation of the memory device 2226, the controller interface circuit 2410 may generate the data strobe signal DQS that toggles. For example, the controller interface circuit 2410 may generate the data strobe signal DQS, which changes from a static state (for example, a high level or a low level) to a toggle state, before the data DATA is transmitted. The controller interface circuit 2410 may transmit the data signal DQ including the data DATA to the memory device 2226, based on toggle timings of the data strobe signal DQS.

The controller interface circuit 2410 may receive the ready/busy output signal nR/B from the memory device 2226 through the eighth pin P28. The controller interface circuit 2410 may determine the state information of the memory device 2226, based on the ready/busy output signal nR/B.

While the present disclosure has been particularly shown and described with reference to embodiments thereof, it will be understood by those of ordinary skill in the pertinent art that various changes in form and details may be made therein without departing from the spirit and scope of the following claims.

What is claimed is:

1. A processor configured to control a storage device, the processor comprising:
at least one host write buffer generated based on device information of the storage device, the device information including at least one of a program method of the storage device and a unit of interleaving processing for simultaneously processing a request received from a host;
meta-memory buffer configured to merge write commands of non-consecutive logical block addresses; and
a control module configured to control the at least one host write buffer,
wherein the control module is further configured to store, in the at least one host write buffer, a plurality of write commands and merge the plurality of write commands to generate a merged write command,
wherein the meta-memory buffer is further configured to be dynamically allocated according to a number of write commands merged in the at least one host write buffer and store meta information including at least one of a logical block address and length information of data corresponding to each of the write commands.

2. The processor of claim 1,
wherein the plurality of write commands are generated by a host,
wherein the control module is further configured to transmit the generated merged write command to the storage device.

3. The processor of claim 1, wherein generating the at least one host write buffer comprises allocating a size of the at least one host write buffer based on at least one of the program method of the storage device and the unit of interleaving processing for simultaneously processing, by several chips, in response to the request received from the host.

4. The processor of claim 1, wherein the at least one host write buffer comprises at least one of a first host write buffer and a second host write buffer based on an input/output scheduling method.

5. The processor of claim 1, wherein the control module is further configured to generate an extra header segment (EHS) including the meta information.

6. The processor of claim 1, wherein the control module is further configured to generate a write buffer command including the meta information.

7. The processor of claim 1, wherein the control module is further configured to transmit, to the host, a first command response corresponding to a first write command among the plurality of write commands when the first write command among the plurality of write commands is stored in the at least one host write buffer, and
transmit, to the host, a second command response corresponding to a second write command among the plurality of write commands when the second write command among the plurality of write commands is stored in the at least one host write buffer.

8. The processor of claim 1, wherein the at least one host write buffer is allocated for each stream in a multi-stream mode.

9. The processor of claim 1, wherein the storage device is divided and controlled in units of zones, and the at least one host write buffer is configured to correspond to the zones.

10. A storage system comprising:
a host; and
a storage device,
wherein the host comprises:
at least one host write buffer generated based on device information of the storage device, the device information including at least one of a program method of the storage device and a unit of interleaving processing for simultaneously processing a request received from a host;
meta-memory buffer configured to merge write commands of non-consecutive logical block addresses; and
a control module configured to control the at least one host write buffer,
wherein the control module is further configured to store, in the at least one host write buffer, a plurality of write commands generated by the host and merge the plurality of write commands to generate a merged write command,
wherein the meta-memory buffer is further configured to be dynamically allocated according to a number of write commands merged in the at least one host write buffer and store meta information including at least one of a logical block address and length information of data corresponding to each of the write commands.

11. The storage system of claim 10,
wherein the control module is further configured to transmit the generated merged write command to the storage device.

12. The storage system of claim 10, wherein generating the at least one host write buffer comprises allocating a size of the at least one host write buffer based on at least one of the program method of the storage device and the unit of interleaving processing for simultaneously processing by several chips in response to the request received from the host.

13. The storage system of claim 10, wherein the at least one host write buffer comprises at least one of a first host write buffer and a second host write buffer based on an input/output scheduling method.

14. The storage system of claim 10, wherein the control module is further configured to transmit, to the host, a first command response corresponding to a first write command among the plurality of write commands when the first write command among the plurality of write commands is stored in the at least one host write buffer, and
transmit, to the host, a second command response corresponding to a second write command among the plurality of write commands when the second write command among the plurality of write commands is stored in the at least one host write buffer.

15. The storage system of claim 10, wherein the at least one host write buffer is allocated for each stream in a multi-stream mode.

16. The storage system of claim 10, wherein the storage device is divided and controlled in units of zones, and the at least one host write buffer is configured to correspond to the zones.

17. A method of controlling a storage device, the method comprising:
generating at least one host write buffer based on device information of the storage device, the device information including at least one of a program method of the storage device and a unit of interleaving processing for simultaneously processing a request received from a host:
storing, in the at least one host write buffer, a plurality of write commands generated by a host;
storing, in a meta memory buffer, meta information including at least one of a logical block address and length information of data corresponding to each of the write commands; and
merging the plurality of write commands to generate a merged write command,
wherein the meta memory buffer is further configured to merge write commands of non-consecutive logical block addresses and be dynamically allocated according to a number of write commands merged in the at least one host write buffer.

18. The method of claim 17, wherein the storing in the at least one host write buffer comprises:
transmitting, to the host, a first command response corresponding to a first write command among the plurality of write commands when the first write command among the plurality of write commands is stored in the at least one host write buffer; and
transmitting, to the host, a second command response corresponding to a second write command among the plurality of write commands when the second write command among the plurality of write commands is stored in the at least one host write buffer.

* * * * *